United States Patent
Kim et al.

(10) Patent No.: US 8,275,488 B2
(45) Date of Patent: Sep. 25, 2012

(54) DIGITAL EXCITATION CONTROL SYSTEM UTILIZING SWARM INTELLIGENCE AND AN ASSOCIATED METHOD OF USE

(75) Inventors: Kiyong Kim, Collinsville, IL (US); Pranesh Rao, Edwardsville, IL (US); Jeff Burnworth, Swansea, IL (US)

(73) Assignee: Basler Electric Co., Highland, IL (US)

( * ) Notice: Subject to any disclaimer, the term of this patent is extended or adjusted under 35 U.S.C. 154(b) by 905 days.

(21) Appl. No.: 12/183,781

(22) Filed: Jul. 31, 2008

(65) Prior Publication Data

US 2009/0198386 A1    Aug. 6, 2009

Related U.S. Application Data

(63) Continuation-in-part of application No. 12/023,145, filed on Jan. 31, 2008.

(51) Int. Cl.
G05B 13/04    (2006.01)

(52) U.S. Cl. .......................................... 700/287; 700/37

(58) Field of Classification Search ................... 700/37, 700/286, 287, 297, 298; 703/18; 322/19
See application file for complete search history.

(56) References Cited

U.S. PATENT DOCUMENTS

| | | | |
|---|---|---|---|
| 4,563,734 A | 1/1986 | Mori et al. | |
| 5,124,626 A | 6/1992 | Thoen | |
| 5,294,879 A | 3/1994 | Freeman et al. | |
| 5,691,896 A | 11/1997 | Zou et al. | |
| 6,549,858 B1 | 4/2003 | Shelley et al. | |
| 6,577,908 B1 | 6/2003 | Wojsznis et al. | |
| 6,697,767 B2 | 2/2004 | Wang et al. | |
| 6,700,356 B1 | 3/2004 | Dorn | |
| 6,760,716 B1 | 7/2004 | Ganesamoorthi et al. | |
| 7,024,253 B2 | 4/2006 | Gaikwad et al. | |
| 2003/0195641 A1 | 10/2003 | Wojsznis et al. | |
| 2005/0149209 A1 | 7/2005 | Wojsznis et al. | |
| 2007/0208677 A1 | 9/2007 | Goldberg et al. | |
| 2011/0166716 A9 * | 7/2011 | Rovnyak et al. | 700/287 |

OTHER PUBLICATIONS

Zwe-Lee Gaing; , "A particle swarm optimization approach for optimum design of PID controller in AVR system," Energy Conversion, IEEE Transactions on , vol. 19, No. 2, pp. 384-391, Jun. 2004.*

(Continued)

*Primary Examiner* — Dave Robertson
(74) *Attorney, Agent, or Firm* — Polster, Lieder, Woodruff & Lucchesi, L.C.

(57) ABSTRACT

A system and method of use for self-tuning a PID controller utilized with an exciter and generator is disclosed. The system includes a power source, an exciter electrically connected to the power source, a generator that is electrically energized by the exciter, and a processor that provides a PID controller that calculates an estimated exciter time constant and an estimated generator time constant using particle swarm optimization ("PSO") to control exciter field voltage. The particle swarm optimization ("PSO") technique includes increasing the voltage reference by a predetermined percentage over a predetermined time period, initializing each particle position of exciter time constant and generator time constant, calculating generator voltage, performing a fitness evaluation and then obtaining and updating best values. This is followed by repeating the steps of determining the generator voltage, the fitness evaluation, and the best values over a predetermined number of iterations.

16 Claims, 16 Drawing Sheets

OTHER PUBLICATIONS

V. Mukherjee, S.P. Ghoshal, Intelligent particle swarm optimized fuzzy PID controller for AVR system, Electric Power Systems Research, vol. 77, Issue 12, Oct. 2007, pp. 1689-1698.*

G. Sanchez, M. Villasana and M. Strefezza, Multi-objective pole placement with evolutionary algorithms. Lecture Notes in Computer Science, 4403 (2007), p. 417.* del Valle, Y.; Venayagamoorthy, G.K.; Mohagheghi, S.; Hernandez, J.-C.; Harley, R.G.; , "Particle Swarm Optimization: Basic Concepts, Variants and Applications in Power Systems," Evolutionary Computation, IEEE Transactions on , vol. 12, No. 2, pp. 171-195, Apr. 2008.*

AlRashidi, M.R.; El-Hawary, M.E.; , "A Survey of Particle Swarm Optimization Applications in Electric Power Systems," Evolutionary Computation, IEEE Transactions on , vol. 13, No. 4, pp. 913-918, Aug. 2009.*

A.M. El-Zonkoly, Optimal tuning of power systems stabilizers and AVR gains using particle swarm optimization, Expert Systems with Applications, vol. 31, Issue 3, Oct. 2006, pp. 551-557.*

Kiyong Kim; Rao, P.; Burnworth, J.A.; , "Self-Tuning of the PID Controller for a Digital Excitation Control System," Industry Applications, IEEE Transactions on , vol. 46, No. 4, pp. 1518-1524, Jul.-Aug. 2010.*

Kiyong Kim; Rao, P.; Burnworth, J.; , "Application of Swarm Intelligence to a digital excitation control system," Swarm Intelligence Symposium, 2008. SIS 2008. IEEE , vol., No., pp. 1-8, Sep. 21-23, 2008.*

M. Nasri , H. Nezanabadi-pour and M. Maghfoori "A PSO-based optimum design of PID controller for a linear brushless DC motor", Proc. World Acad. Sci., Eng., Technol., vol. 20, pp. 211 2007.*

Flynn et al.; "A Self-Tuning Automatic Voltage Regulator Designed for an Industrial Environment"; IEEE Transactions on Energy Conversion; Jun. 1996; pp. 429-434; vol. 11, No. 2.

Kanniah et al.; "Self-Tuning Regulator Based on a Dual-Rate Sampling"; IEEE Transactions on Automatic Control; Aug. 1984; pp. 755-759; vol. AC 29, No. 8.

Kim et al.; "Turning a PID Controller for a Digital Excitation Control System" IEEE Transaction on Industry Applications; Mar./Apr. 2005; pp. 485-492; vol. 41, No. 2.

International Search Report and Written Opinion from Corresponding PCT/US2009/032834 dated Mar. 12, 2009.

International Preliminary Report on Patentability from Corresponding PCT/US2009/32834 Dated Jun. 29, 2012.

* cited by examiner

TABLE
ESTIMATION RESULTS OF THE PROPOSED METHODS

External Power Input

| Time constants (Te, T'do) | RLS | PSO |
|---|---|---|
| (0.15, 2.0) | (0.14, 1.99) | (0.13, 2.01) |
| (0.3, 3.0) | (0.29, 3.0) | (0.31, 3.1) |
| (0.5, 4.0) | (0.49, 4.0) | (0.51, 4.09) |

Self-Excited Power Input

| Time constants (Te, T'do) | RLS | PSO |
|---|---|---|
| (0.15, 2.0) | (0.15, 1.98) | (0.13, 1.96) |
| (0.3, 3.0) | (0.3, 2.98) | (0.28, 3.02) |
| (0.5, 4.0) | (0.5, 3.98) | (0.48, 3.90) |

Shunt Case With Noise
(10% Relative Error In The Generator Voltage)

| Time constants (Te, T'do) | RLS | PSO |
|---|---|---|
| (0.15, 2.0) | (0.15, 1.98) | (0.13, 1.82) |
| (0.3, 3.0) | (0.3, 2.98) | (0.25, 2.85) |
| (0.5, 4.0) | (049, 3.98) | (0.43, 3.77) |

Fig. 12

DIGITAL EXCITATION CONTROL SYSTEM UTILIZING SWARM INTELLIGENCE AND AN ASSOCIATED METHOD OF USE

CROSS-REFERENCE TO RELATED APPLICATION

This application is a continuation-in-part of U.S. patent application Ser. No. 12/023,145, filed on Jan. 31, 2008, which is incorporated herein by reference in its entirety.

BACKGROUND OF THE INVENTION

An electrical generator typically operates by rotating a coil of wire relative to a magnetic field (or vice versa). In modern electrical generators, this magnetic field is typically generated using electromagnets known as field coils. An electrical current in these field coils provides the magnetic field necessary to induce an electrical current in the main generator coil. The current and voltage output of the main generator depends on the current in the field coils. Thus, as the generator load changes, the magnetic field strength must be adjusted in an attempt to maintain constant generator output. This is achieved by regulating the current in the field coils. Thus, it is desirable to regulate continuously the current in the field coils.

In many modern electrical generators, the electrical current in the field coils is provided by an exciter generator. Thus, the problem of regulating the main generator field strength is typically achieved by regulating the output of the exciter generator. The exciter generator can include its own exciter field coils, in which case the output of the exciter generator can be controlled by regulating the current supplied to the exciter field coils.

The output of a voltage regulator can provide power to the field coils of an exciter or generator. The voltage regulator can therefore be used to control the output of an exciter generator, and thereby control the output of a main generator. One important purpose of a voltage regulator is to maintain the output of a main generator at a constant voltage, known as the "set point," under various conditions. The difference between the set point and the actual main generator output is "error."

Many different types of voltage regulators have been proposed for excitation systems. One of the most popular modern voltage regulator systems utilizes a Proportional, Integral, and Derivative ("PID") controller. A PID controller monitors the output of the generator and adjusts its own output depending on sensed generator output. As the name implies, the PID controller provides three types of control: proportional, integral, and derivative. Proportional control responds in proportion to the error. Integral control responds to the sum of previous errors. Derivative control responds to the rate of change of the error.

The relative weights of these three types of control in a PID controller must be set for accurate control of the generator output. Choosing these relative weights is known as "tuning" the PID controller. The goal is to achieve a "fast" excitation system that will respond to a disturbance by quickly bringing the generator output back to the set point. An ideal excitation system achieves the set point with as little overshoot and undershoot as possible. Overshoot occurs when the controller provides too much current, thereby causing a "spike" in main generator output. Undershoot occurs when the controller provides too little current, thereby causing a "dip" in main generator output. A poorly tuned PID controller will result in poor performance, e.g., overshoot, undershoot, or slow response time. A well-tuned excitation system offers benefits in overall operating performance by responding quickly to transient conditions such as system faults, disturbances, and motor starting. After a fault, a fast excitation system will improve transient stability by holding up the system voltage and providing positive damping to system oscillations. A well-tuned excitation system will minimize voltage overshoot after a disturbance and avoid the nuisance tripping of generator protection circuits. When a motor is powered by a generator, the motor presents a large load while the motor is starting, which can cause the generator output voltage to dip. A dip in generator output voltage can cause damage to the motor as the motor will increase its current consumption and heats up due to resistive heating within the motor. During motor starting, a fast excitation system will minimize the generator voltage dip and reduce the heating losses of the motor.

The controller gains are determined using several excitation system parameters, such as voltage loop gain, open circuit time constants, and so forth. These parameters vary not only with the system loading conditions, as generally illustrated by numeral 2 in FIG. 1, but also system configuration dependent gains such as power input voltage.

In general, since the calculation of loop gain requires several excitation system parameters that are generally not available during commissioning, e.g., specifically the machine time constant, this lack of information increases commissioning time. Many times there is no access to the actual equipment but only to a manufacturer's data sheet, or some typical data set. For this case, the only available measurement to check excitation system performance is the combined response of exciter and generator as generally illustrated by numeral 4 in FIG. 2. Under these conditions, commissioning a new voltage regulator becomes a challenging task.

One method of tuning the PID controller is by trial-and-error. Trial-and-error is tedious and adds significantly to commissioning time. Consequently, several automatic "self-tuning" algorithms have been proposed.

One difficulty in regulating the voltage output of a generator arises due to the inductive properties of a coil of wire, such as a field coil winding. Since the excitation system and the generator contain inductive coils, there is a time delay between a change in output voltage from the voltage regulator and the corresponding change in generator output voltage. The length of this delay is determined by "time constant." The main time constants of concern are the exciter time constant and the generator time constant. In the present invention, these time constants are estimated and taken into account when tuning the PID controller, thereby achieving improved performance. Also, today's digital voltage regulators are designed to achieve about 0.25% regulation accuracy at rated voltage. The accuracy of a digital voltage regulator is mostly determined by truncation error in an analog/digital ("AD") converter and thermal noise in interface circuits. Institute of Electrical and Electronics Engineers, Inc. ("I.E.E.E.") Standard 421.5 recommends two percent (2%) step responses for testing or analyzing performance of an excitation control loop. Thus, generator voltages due to small perturbation in excitation are measured with a very poor signal-to-noise ratio. For example, the relative accuracy of a two percent (2%) step response test becomes about a ten percent (10%) error in measurement. Therefore, in this case, it is difficult to identify the exciter and generator time constants. Experiments show very slow convergence speed in identification, which is much slower than today's fast excitation system requirements.

The present invention is directed to overcoming one or more of the problems set forth above.

SUMMARY OF INVENTION

The present invention relates to an automatic algorithm for tuning a PID controller using a Particle Swarm Optimization (PSO) technique.

In another aspect of the present invention, the PSO technique is used to estimate time constants for an exciter and generator in an excitation system.

In still another aspect of the present invention, the estimated exciter and generator time constants are used to calculate PID gains (proportional gain $K_P$, integral gain $K_I$ and derivative gain $K_D$).

In yet another aspect of the present invention, the calculated PID gains are fixed during commissioning. Preferably, no further tuning is conducted during normal operation. One benefit of this approach is that no supervision is needed to prevent undesirable responses caused by a transient behavior of the PID gain estimation.

In still yet another aspect of the present invention, a system for self-tuning a PID controller utilized with an exciter and generator is disclosed. The system includes a power source, an exciter electrically connected to the power source, a generator that is electrically energized by the exciter, and a processor that provides a PID controller that calculates an estimated exciter time constant and an estimated generator time constant using particle swarm optimization to control exciter field voltage.

In another aspect of the present invention, a system for self-tuning a PID controller utilized with an exciter and generator is disclosed. The system includes a power source, an exciter electrically connected to the power source, a generator that is electrically energized by the exciter, and a processor that provides a PID controller that performs a system step response by increasing the voltage reference by a predetermined percentage over a predetermined time period, initializes each particle position of exciter time constant and generator time constant, calculates generator voltage, performs a fitness evaluation and then obtains and updates best values and then repeats calculating the generator voltage, the fitness evaluation and the best values over a predetermined number of iterations.

In yet another aspect of the present invention, a system for self-tuning a PID controller utilized with an exciter and generator is disclosed. The system includes a power source, an exciter electrically connected to the power source, a generator that is electrically energized by the exciter, a first processor that provides a PID controller with a combination of a reference voltage, a system step response by increasing the voltage reference by a predetermined percentage over a predetermined time period and a calculated generator voltage, and a second processor that receives the system step response and the calculated generator voltage through a communications link and then compares a simulation of a step response using the system step response and measured step response from a voltage regulator and then performs an adjustment using particle swarm optimization which is then provided to the simulation of a step response and also utilized in calculating an estimated exciter time constant, an estimated generator time constant, and PID gains, which are then provided through the communications link to the first processor, wherein the second processor controls a self-tuning mode and obtains operating status, which includes at least one of the estimated exciter time constant, the estimated generator time constant and the PID gains, and an electronic display that is electrically connected to the second processor for displaying at least one of the operating status, a diagnostic function, the estimated exciter time constant, the estimated generator time constant and the PID gains with real time monitoring.

In still yet another aspect of the present invention, a method for self-tuning a PID controller utilized with an exciter and generator is disclosed. The method includes calculating an estimated exciter time constant and an estimated generator time constant with particle swarm optimization with a processor that provides a PID controller, and utilizing the estimated exciter time constant and the estimated generator time constant to calculate PID gains with the processor to control exciter field voltage to an exciter, wherein the exciter electrically connected to the power source and a generator is electrically energized by the exciter.

These are merely some of the innumerable aspects of the present invention and should not be deemed an all-inclusive listing of the innumerable aspects associated with the present invention.

BRIEF DESCRIPTION OF THE DRAWINGS

For a better understanding of the present invention, reference may be made to accompanying drawings, in which:

FIG. 12 is a comparison of time constants, i.e., $T'_{do}$ and $T_e$, for the Recursive Least Square ("RLS") with linearization via feedback in comparison to Particle Swarm Optimization ("PSO") technique with an external power input, for a self-excited power input; and a shunt case with noise, i.e., 10% relative error in generator voltage;

DETAILED DESCRIPTION OF THE INVENTION

In the following detailed description, numerous exemplary specific details are set forth in order to provide a thorough understanding of the invention. However, it will be understood by those skilled in the art that the present invention may be practiced without these specific details, or with various modifications of the details. In other instances, well known methods, procedures, and components have not been described in detail so as not to obscure the present invention.

Figure 1:
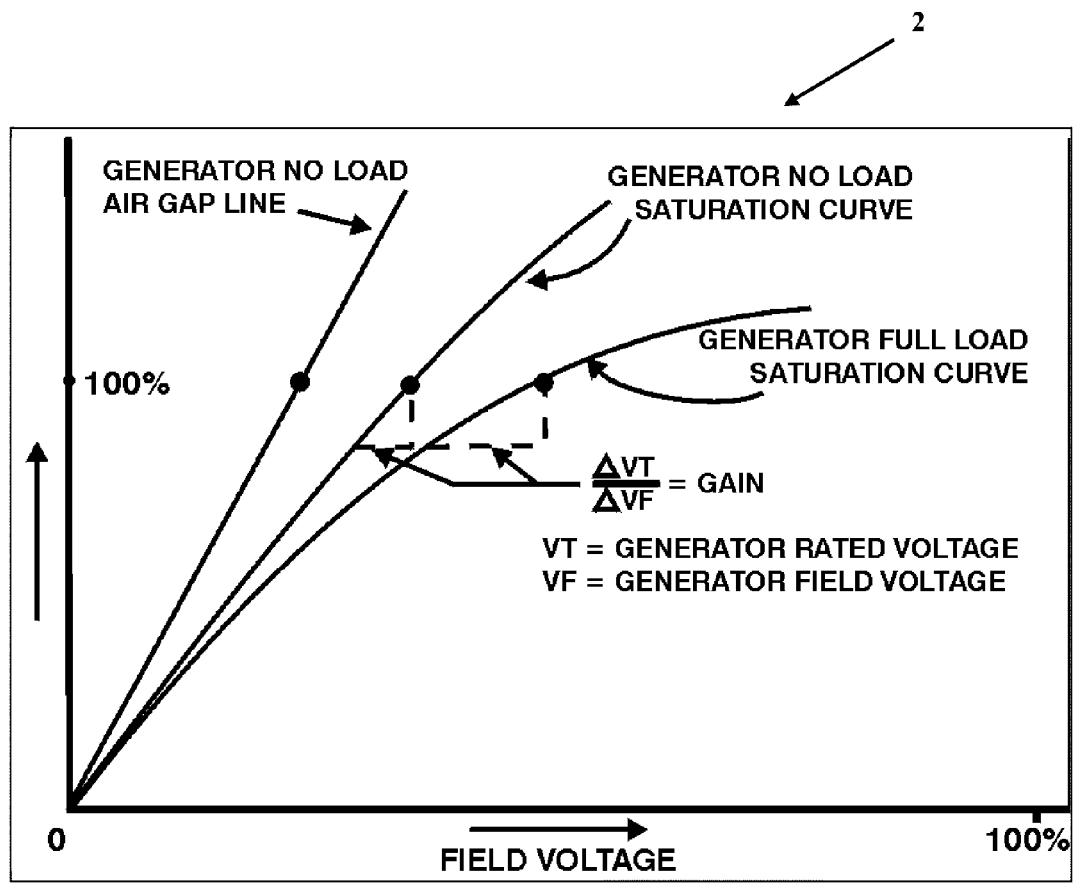
FIG. 1 is a graphical representation of a generator saturation curve illustrating generator gain.
Figure 2:
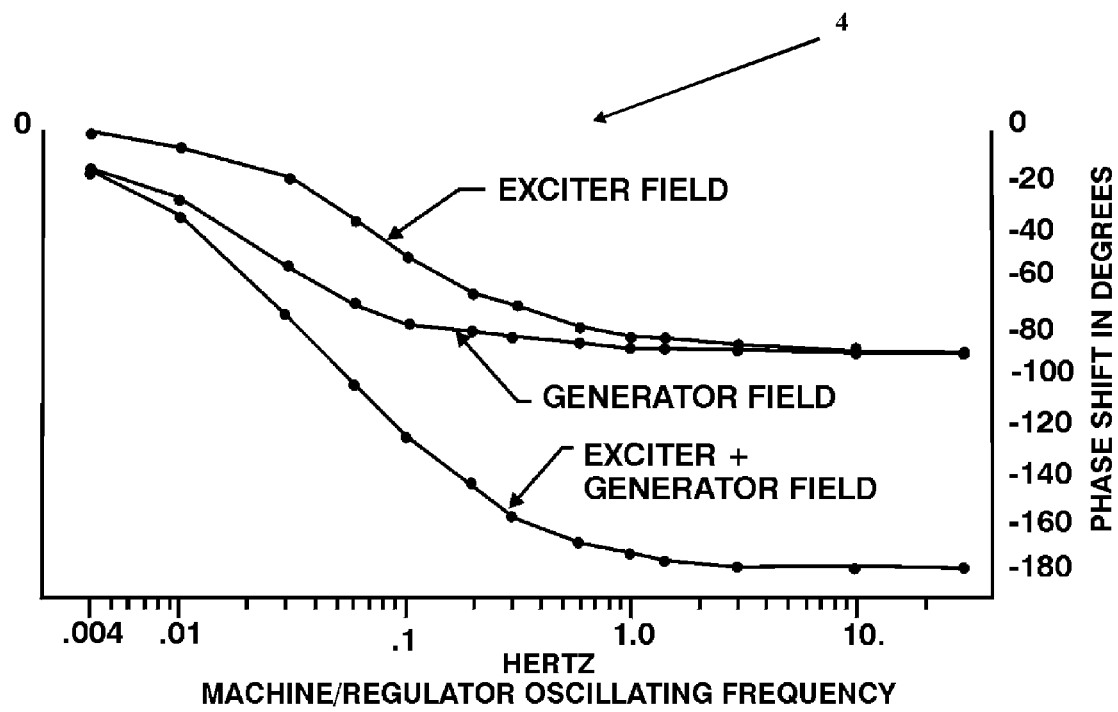
FIG. 2 is a graphical representation of a phase shift in degrees for an exciter field, a generator field, and the summation of the phase shift for the exciter field and the generator field in relationship to machine/regulator oscillating frequency.
Figure 3:
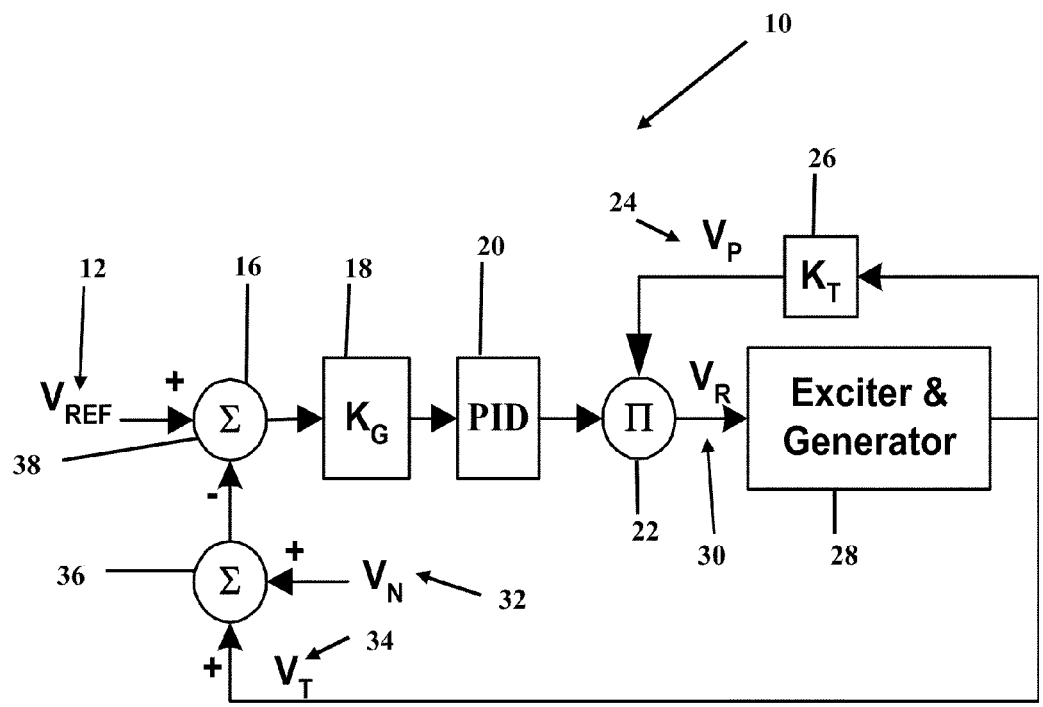
FIG. 3 depicts a block diagram representation of a simplified excitation control system with automatic voltage regulators.

Referring now to FIG. 3, the basic block diagram of a self-exciting excitation control system with exemplary PID block utilized in an automatic voltage regulator control loop is generally indicated by numeral 10. In addition to the PID block 20, the system loop gain $K_G$ 18 provides an adjustable term to compensate for variations in system input voltage to a power converting bridge. The transfer function Gc(s) of the PID controller 20 may be expressed as $$G_C = K_G V_P \left( K_P + \frac{K_I}{s} + \frac{K_D s}{1 + T_D s} \right),$$

where $K_G$ is loop gain, $K_P$ is proportional gain, $K_I$ is integral gain, $K_D$ is derivative gain, $V_P$ is power input voltage, $T_D$ is derivative filter time constant and "s" is the Laplace operator.

The generator reference voltage $V_{REF}$ 12 is summed 16 with the summation 36 of the noise in the terminal voltage $V_N$ 32 with the sensed generator voltage $V_T$ 34 to form a voltage error signal. This voltage error signal is multiplied by the loop gain $K_G$ 18. This scaled voltage error signal is utilized to generate three terms with corresponding gains with the PID control 20, i.e., the proportional gain $K_P$, the integral gain K, and the derivative gain $K_D$. The output of the PID control 20 is multiplied 22 by the power input voltage $V_P$ 24 to create the voltage regulator output $V_R$ 30. For the external power input case, $V_P$ 24 becomes a constant. Therefore, a linear theory can be applied for small signal stability. On the other hand, if the power input can be derived from the generator voltage for a self-excitation application, i.e., $V_P = K_T V_T$ where $K_T$ 26 is a gain to represent a power transformer. The exciter field voltage is the output of the PID control 20 multiplied by the power input voltage $V_P$ 24. In this case, the excitation control system 10 becomes a bilinear system for the exciter and generator 28.

Figure 4:
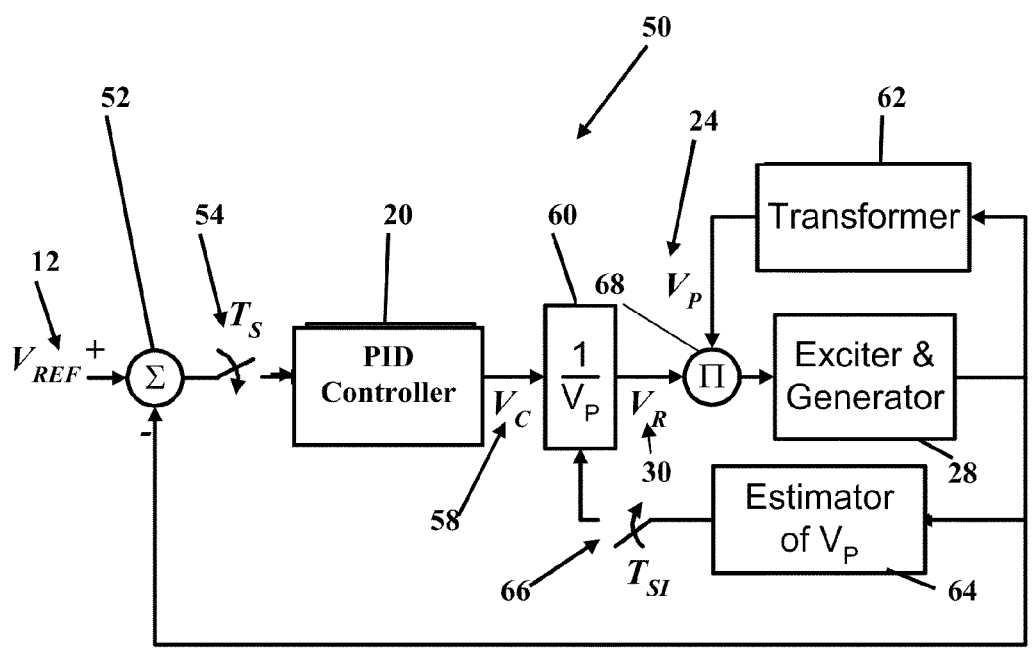
FIG. 4 depicts a block diagram representation for feedback linearization of a self-excitation control system.

In order to make the self-exciting control system a linear system, a simple feedback linearization loop is implemented as shown in FIG. 4 and is generally indicated by numeral 50. The generator reference voltage $V_{REF}$ 12 is summed 52 with the output of the exciter and generator 28. There is an outer loop sampling time $T_S$ 54 that is applied to this summation 52 and then provided as input to the PID controller 20. The sensed voltage $V_C$ 58 is provided as output by the PID controller 20. The output of the exciter and generator 28 provides input to create an estimator of power input voltage $V_P$ 64. There is an inner loop sampling time $T_{SI}$ 66 connected to the estimator of power input voltage $V_P$ 64. As the sampling time $T_{SI}$ 66 of the inner loop increases, a bilinear characteristic appears in the system response. An illustrative, but nonlimiting, value of sampling time would be fifty (50) milliseconds. The selection of 50 milliseconds has been determined based on the simulation results with time constants of the industrial excitation control system under a practical noise environment. The sensed voltage $V_C$ 58 is scaled 60 by the inverse of the power input voltage $V_P$ 24 to provide the voltage regulator output $V_R$ 30. The output of the exciter and generator 28 provides input to a transformer 62 that generates the power input voltage $V_P$ 24, which is then multiplied 68 by the voltage regulator output $V_R$ 30.

With inner loop control implemented, a linear estimation algorithm can be utilized. Thus, the plant transfer function G(s) is approximated as:

$$G(s) = K_s \left( \frac{1}{1 + sT_e} \right) \left( \frac{1}{1 + sT'_{do}} \right),$$

where $K_S$, $T_e$, and $T'_{do}$ are the system gain, the exciter and generator time constants, respectively.

The gain $K_G$ 18 in FIG. 3 is used for compensating variations in system configuration dependent gains such as power input voltage ($V_P$) 24 and saturation effects, i.e., loop gain, i.e., $K_G$, multiplied by the system gain, i.e., $K_S$, is equal to one (1).

First, the loop gain, i.e., $K_G$, 18 is estimated based on a steady state condition that is preferably near the rated generator voltage. This is preferably accomplished with a robust controller having a soft start feature. The soft start feature is preferably designed to avoid a large voltage overshoot during voltage buildup.

The PID controller 20 is utilized to measure the voltage regulator output $V_{R\ 30}$ and terminal voltage $V_T$ 34, as shown in FIG. 3. The voltage regulator output $V_{R\ 30}$ and terminal voltage $V_T$ 34 are measured in a steady-state condition of the closed loop with the PID controller 20. The steady-state condition is determined when the generator voltage variation is less than a predetermined value, e.g., 0.005 p.u., for more than a predetermined time period, e.g., ten (10) seconds. The regulator output and generator voltage are utilized to obtain the loop gain, i.e., $K_G$, 18. The steps for calculating the loop gain, i.e., $K_G$, 18, would be as follows: (a) check residual voltage with a zero voltage regulator output; (b) find an open loop output that corresponds to the residual voltage; (c) find a regulator output corresponding to the nominal generator voltage using the PID controller 20; and (d) calculate loop gain, i.e., $K_G$, 18, which is equal to the PID controller 20 output voltage $V_R$ 30 divided by the sensed generator voltage $V_T$ 34, i.e., $K_G = V_R / V_T$.

One method for estimating time constants includes Particle Swarm Optimization (PSO). Particle Swarm Optimization (PSO) is a technique that can be used to estimate PID gain values (the proportional gain $K_P$, the integral gain $K_I$ and the derivative gain $K_D$). PSO is an evolutionary computation technique and is inspired by social behavior of birds flocking or fish schooling. The system is initialized with a population of random solutions and searches for optima by updating generations. The PSO technique mimics behaviors found in nature. The idea is to search a solution space using a "swarm" of simulated individuals or "particles." Each particle has a position in the search space, where each position corresponds to one possible solution to the problem. Each particle has an associated velocity vector. Each particle flies in the search space according to specified rules. These rules, for example, can include: (1) each particle remembers its own personal best solution found so far (pbest); (2) each particle is aware of the global best solution found so far all particles in the swarm (gbest); (3) each particle is programmed to move toward its personal best (pbest) location(s); and (4) each particle is programmed to move toward the global best (gbest) location(s).

Typically, each particle moves once per iteration, and the program is executed over a pre-determined number of iterations. Each particle's position is evaluation according to a "fitness function," which determines the desirability of that solution. Once the software program has reached the iteration limit, the best values found so far are used as the estimated optimal values.

Based on an estimated value of system gain, i.e., Ks, the system parameter is normalized in per unit. A simple feedback linearization loop is constructed to eliminate bilinear system characteristics that may be present in the system shown in FIG. 3. Overall, for simulation of the system, the Euler integration method is utilized for solving ordinary differential equations of dynamic models with an integration step size of a predetermined value, e.g., ten (10) milliseconds. Therefore, the power input is estimated for every predetermined time period, e.g., ten milliseconds, and the controller output is scaled by the power input voltage to eliminate a bilinear effect.

Figure 5:
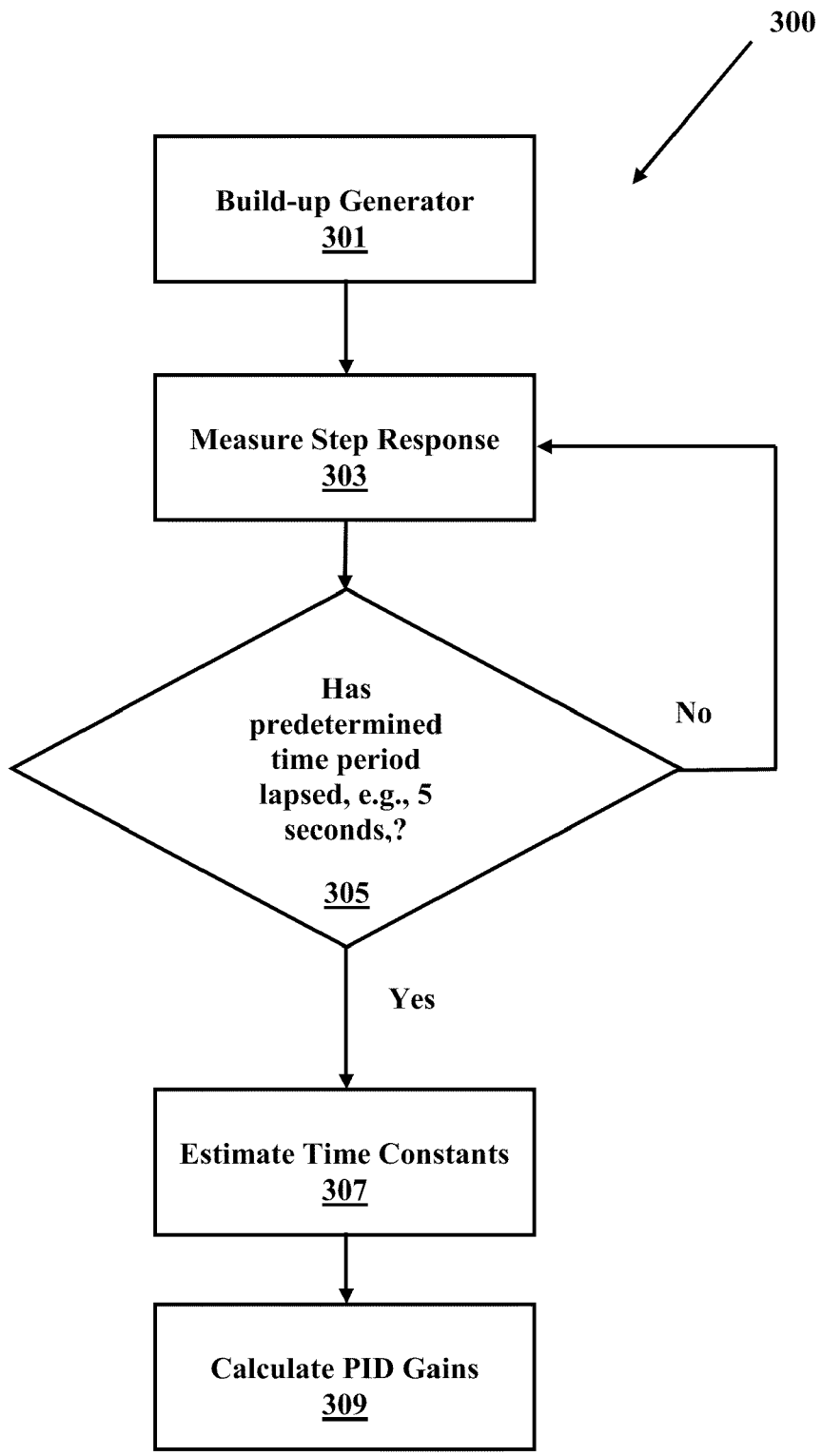
FIG. 5 is a flowchart for the overall process of an exemplary embodiment for calculating PID gains.

In the description of the flowcharts, the functional explanation marked with numerals in angle brackets <nnn>, will refer to the flowchart blocks bearing that numeral. FIG. 5 depicts an exemplary flow chart for the overall process in an exemplary embodiment and is generally indicated by numeral 300. The first step <301> involves the building up of the generator voltage to a predetermined value, e.g., 0.9 p.u. The second step <303> is for the system to measure the system step response of the generator. Preferably, the system step response is measured by increasing the voltage reference by predetermined percentage, e.g., five percent (5%), and measuring the generator voltages during a first predetermined time period, e.g., every fifty (50) milliseconds. This process is repeated in the third step <305> for a second predetermined time period, e.g., five (5) seconds.

The set of data measured is referred to as the actual system step response and is stored for later use in the PSO algorithm. In the fourth step <307>, the system estimates exciter time constants $T_e$, and generator time constants $T'_{do}$. Preferably, a Particle Swarm Optimization algorithm is used to estimate the exciter time constants $T_e$, and generator time constants $T'_{do}$, as described in detail below with reference to FIG. 6. Finally, at the fifth step <309>, the estimated the exciter time constants $T_e$ and generator time constants $T'_{do}$ from step <305> are used to calculate PID gains. PID gains can be calculated using either pole-zero cancellation or pole-placement, as described in detail below.

Figure 6:
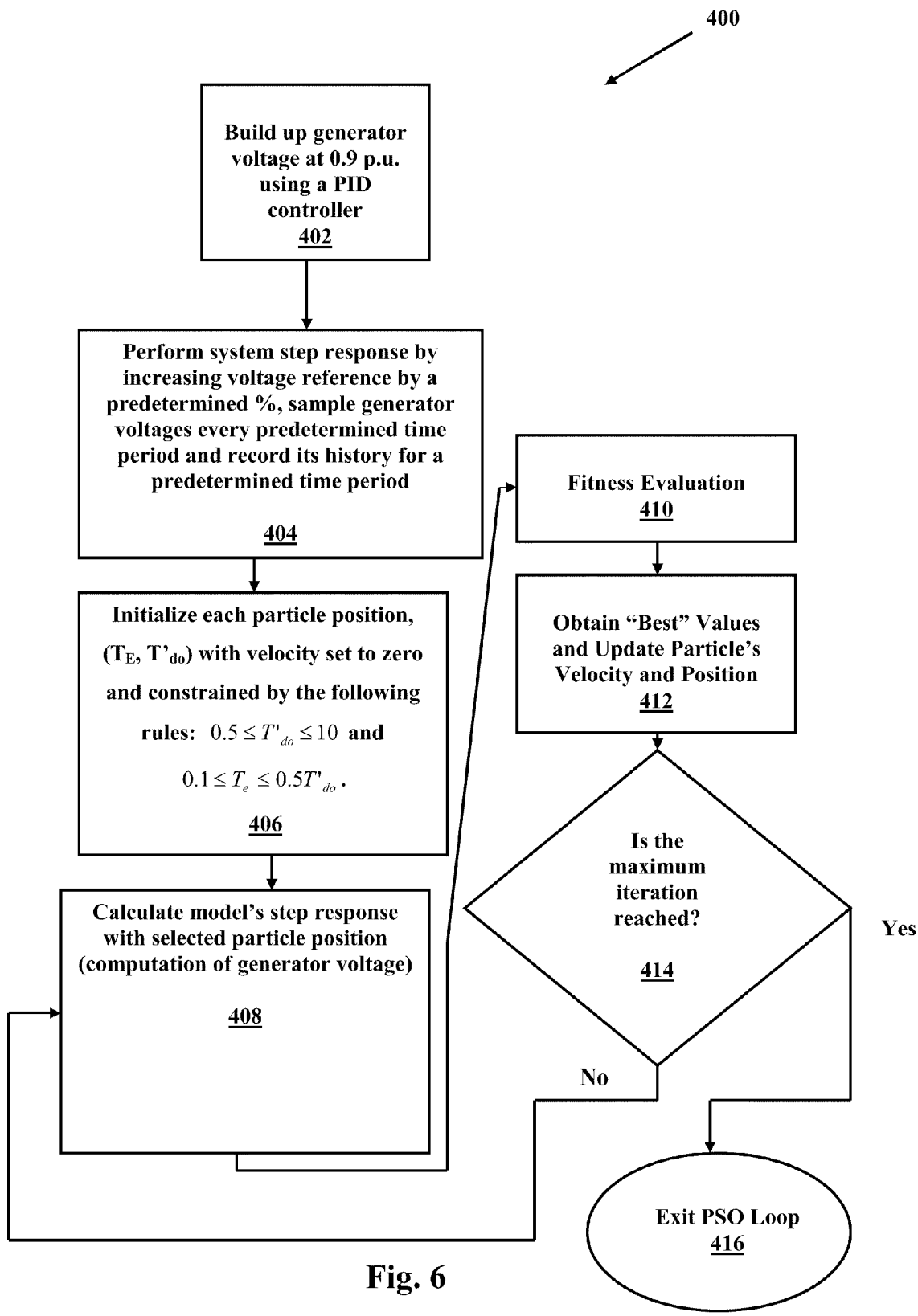
FIG. 6 is a flowchart for an estimation algorithm based on Particle Swarm Optimization (PSO)

FIG. 6 depicts an exemplary, non-limiting algorithm for performing Particle Swarm Optimization (PSO) for estimating exciter and generator time constants. Preferably, each simulated particle has an associated position $x_k$ and velocity $v_k$. Each particle's position is preferably represented by a pair of exciter time constant values $T_e$ and generator time constant values $T'_{do}$ (solutions). The "kth" particle's position can be represented as follows: $x_k = (T'_{do}, T_e)$ where $T'_{do}$ represents the generator time constant and $T_e$ represents the exciter time constant.

In the exemplary flow chart shown in FIG. 6 and indicated generally by numeral 400, the first step of the PSO algorithm includes utilizing the PID controller 20, as shown in FIG. 3, to build-up the generator voltage at a predetermined value, e.g., 0.9 p.u., using a PID controller 20, FIGS. 3 and 4 <402>. This is followed by a second step of performing a voltage step response by increasing voltage reference by a predetermined percentage, e.g., five percent (5%), sampling the generator voltages during a first predetermined time period, e.g., every 50 milliseconds, and then recording the history of the sampled generator voltages during a second predetermined time period, e.g., five second interval <404>. This is a set of recorded data $Z_T(k)$ when k goes from one to a predetermined value, e.g., k=1, . . . , 100.

This set of data for the actual system step response can also be termed a reference response. The third step <406> includes initializing a plurality of particles with a random or pre-selected position. For example, one possible pre-selected initialization of particles ($T_e$, $T'_{do}$) could be: $x_1$=(1.0,0.1), $x_2$=(2.0,0.2), $x_3$=(3.0,0.3), $x_4$=(4.0,0.4) and $x_5$=(5.0,0.5). The associated velocity for each particle (one through five) is preferably initialized at zero: $v_k$=0 for k=1 K 5. This is based on the fact that in general, the exciter time constant is designed about one tenth of the generator time constant for most generator sets. By the same practical reason to simplify computations, the boundary of the search surface is constrained by the following rules: $0.5 \leq T'_{do} \leq 10$ and $0.1 \leq T \leq 0.5 \, T'_{do}$.

Figure 7:
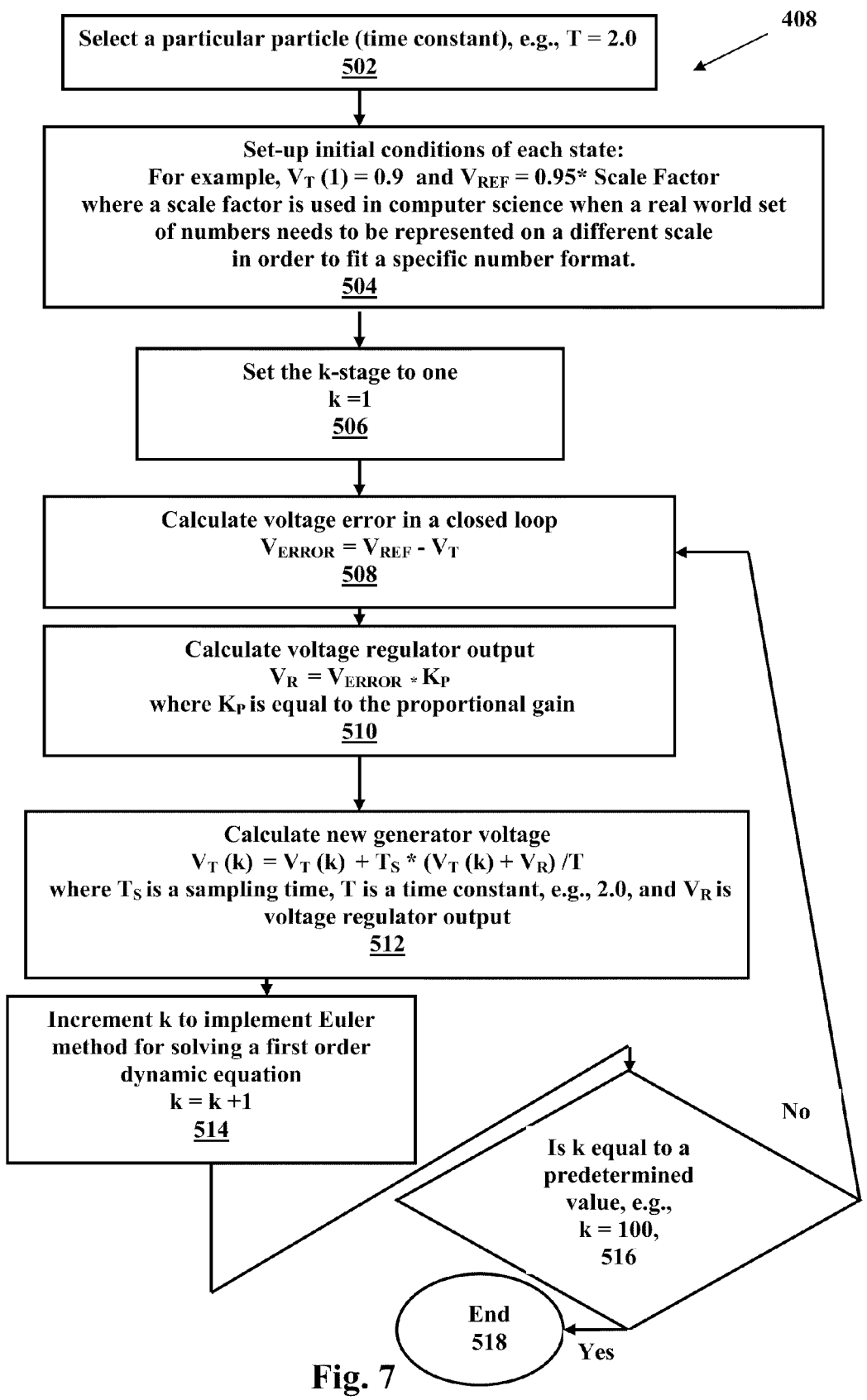
FIG. 7 is a detailed analysis for the step of calculating a model's step response with selected particle position (computation of generator voltage), i.e., process step <408>, from FIG. 6.

The fourth step <408> is to calculate the model's step response with selected particle position (computation of generator voltage). As shown in detail in FIG. 7, the first step <502> is to select a particular particle (time constant). For example, T=2.0. The second step <504> is to set-up the initial conditions of each state. For example, the sensed generator voltage, e.g., $V_T(1)$, can be set equal to 0.9 for 0.9 p.u. and the generator voltage reference $V_{REF}$ can set to 0.95 times a scale factor. A scale factor is used in computer science when a real world set of numbers needs to be represented on a different scale in order to fit a specific number format.

The third step <506> is to set the k-stage equal to one to utilize the Euler method to solve the first order dynamic equation. The fourth step <508> is to calculate the voltage error in a closed loop, which is the generator voltage reference minus the sensed generator voltage, i.e., $V_{ERROR} = V_{REF} - V_T$. The fifth step <510> is to calculate the voltage regulator output which is the generator voltage reference times the proportional gain, i.e., $V_R = V_{ERROR} * K_P$. The sixth step <512> is to calculate a new generator voltage, i.e., $V_T(k) = V_T(k) + T_S * (V_T(k) + V_R)/T$, where $T_S$ is the sampling time, T is the time constant, e.g., 2.0, and $V_R$ is the voltage regulator output for the current value of k.

The seventh step <514> is to increment the value of k to implement the Euler method for solving a first order dynamic equation. A determination is then made as to whether k is equal to a predetermined value <516>, e.g., 100. If the response to this query is positive, the process for step <408> from FIG. 6 ends <518>, and if the response to this query is negative, the process returns to the fourth step <508> to repeat steps <508> through <516> until the predetermined value, e.g., 100, is reached. This provides a set of calculated data $V_T(k)$ when k goes from one to a predetermined value, e.g., k=1, . . . , 100.

The fifth step <410> returning again to FIG. 6, involves comparing the set of recorded data $Z_T(k)$ when k goes from one to a predetermined value, e.g., k=1, . . . , 100 from step <404> with the set of calculated data $V_T(k)$ when k goes from one to a predetermined value, e.g., k=1, . . . , 100 from step <408> with the following exemplary "fitness function" J for evaluation of the quality of a particle's position is:

$$J = \sum_{k=1}^{N} (z_k - y_k)^2,$$

where $z_k$ is the measured generator voltage and $y_k$ is the simulated generator voltage. Preferably, each particle's position is evaluated during each iteration of the particle swarm optimization ("PSO") algorithm. For each particle, a simulated step response is calculated and its results are compared with the actual system step response. Therefore, the fitness function J evaluates the quality of a solution (exciter and generator time constants) by evaluating the difference between the system's simulated step response and the actual system step response.

The sixth step <412>, as shown in FIG. 6, obtains the two best values of time constants of the exciter and the generator, where $T_e$ represents the exciter time constant and $T'_{do}$ represents the generator time constant. Preferably, each particle also has an associated "personal best" value $pbest_k$, which stores the best solution that the particular particle has found. Preferably, the system stores a "global best" solution gbest, which represents the best solution found (so far) by any of the particles. After obtaining the two best values of exciter time constant $T_e$ and generator time constant, $T'_{do}$, the particle updates the particle's velocity and positions.

An exemplary formula for updating particle velocity is given as follows: $v_{k+1} = \alpha v_k + \beta_1 \text{rand}(0,1)[pbest_k - x_k] + \beta_2 \text{rand}(0,1)[gbest - x_k]$, where $x_k$ is the current particle position, a is an inertia weight, $\beta_1$ is equal to a first learning factor and $\beta_2$ is equal to a second learning factor. The expression "rand(0, 1)" represents a random number between zero and one. An exemplary formula for updating particle position is given as follows: $x_{k+1} = x_k + v_k$, where $x_k$ is the current particle position and $v_k$ is the current particle velocity.

The seventh step <414> is a query as to whether the maximum number of predetermined iterations has been reached. If the response to this query is positive, the particle swarm optimization ("PSO") loop is terminated <416>. If the response to this query is negative, then the process returns to the fourth step <408>, which is to calculate the model's step response with selected particle position (computation of generator voltage), as shown in detail in FIG. 7. The fifth step <410> and sixth step <412> are then also repeated until the maximum number of predetermined iterations has been reached in the seventh step <414> and the particle swarm optimization ("PSO") loop is terminated <416>.

Figure 8:
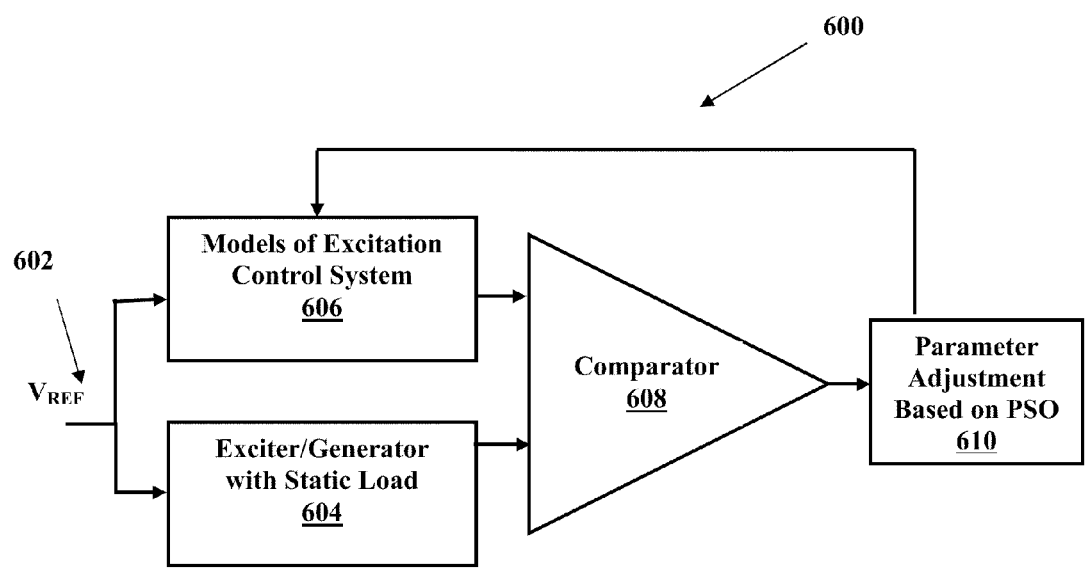
FIG. 8 depicts a block diagram representation for identification utilizing Particle Swarm Optimization (PSO)

In summary, the overall system is shown in FIG. 8 and is generally indicated by numeral 600. The generator voltage reference $V_{REF}$ 602 is applied to the system's actual response of the exciter and the generator with a static load for $T_e$, and $T'_{do}$ where $z_k$ is the measured generator voltage 604. Also, the generator voltage reference $V_{REF}$ 602 is applied to the system's simulated step response for $T_e$, and $T'_{do}$ where $y_k$ is the simulated generator voltage 606. These values are compared with the fitness function, e.g., J, 608. There is then an adjustment made using particle swarm optimization ("PSO") 610 where the best values are obtained and the particles position and velocity are updated as previously described above. This parameter adjustment is then applied to the system's simulated step response for $T_e$, and $T'_{do}$ where $y_k$ is the simulated generator voltage 606 for the modeling of the excitation control system 606.

Upon calculation of the system gain and the exciter and generator time constants, the PID gains can be calculated. $T_D$ represents the derivative filter time constant and $K_S$ is the system gain. To simplify the design of the PID controller, the following assumptions are made:

$K_S = 1$;

$T_D = 0$;

Thus, the plant transfer function G(s) is given as:

$$G(s) = \left(\frac{1}{1+sT_e}\right)\left(\frac{1}{1+sT'_{do}}\right)$$

There are two methods that can be utilized for designing the PID controller: (1) pole-zero cancellation; and (2) pole placement. In one embodiment of the present invention, pole-zero cancellation forces the two zeros resulting from the PID controller to cancel the two poles of the plant. The placement of zeros is achieved via appropriate choice of controller gains. The open-loop transfer function of the system becomes:

$$G_C(s) \cdot G(s) = \frac{K_D\left(s^2 + \frac{K_P}{K_D}s + \frac{K_I}{K_D}\right)}{T'_{do}T_E s\left(s + \frac{1}{T'_{do}}\right)\left(s + \frac{1}{T_e}\right)}$$

For pole-zero cancellation:

Let $K_I = \dfrac{K_D}{T'_{do}T_e}$

Let $K_P = K_D\left(\dfrac{T'_{do} + T_e}{T'_{do}T_e}\right)$

Thus the system transfer function is reduced to:

$$G_C(s) \cdot G(s) = \frac{K_D}{T'_{do}T_e s}$$

so that the closed loop transfer function can then be expressed as:

$$\frac{C(s)}{R(s)} = \frac{G(s)G_C(s)}{1 + G(s)G_C(s)}$$

$$= \frac{K_D/T'_{do}T_e}{s + K_D/T'_{do}T_e}$$

The time response of the closed-loop system to a unit step input is as follows:

$$c(t) = 1 - e^{-\frac{K_D}{T'_{do}T_e}t}$$

If $t_r$ is the specified rise time, the value of $K_D$ is obtained by:

$$K_D = \frac{T'_{do}T_e \ln 9}{t_r \cdot K_G}$$

After calculating $K_D$ according to this equation, $$K_I = \frac{K_D}{T'_{do}T_e}$$

and $$K_P = K_D\left(\frac{T'_{do} + T_e}{T'_{do}T_e}\right)$$

can be used to calculate $K_P$ and $K_I$.

The idea of pole-zero cancellation might seem very difficult to ascertain since exact pole-zero cancellation is almost impossible. The Root-locus plots for cases where the actual and estimated time constants are off by ±20% appear significantly different. However, it has been shown that in spite of these differences, the designed controller parameters result in performance that is acceptable.

In another embodiment of the present invention, pole placement is used to design the PID controller. In this method, the desired closed-loop pole locations are decided on the basis for meeting a transient response specification. In one embodiment, the design forces the overall closed-loop system to be a dominantly second-order system. Specifically, we force the two dominant closed-loop poles to be a complex conjugate pair, (s=−a±jb) resulting in an underdamped response. The third pole is chosen to be a real pole (s=c), and is placed so that the natural mode of response from it is five times faster than the dominant poles. The open loop transfer function is given as:

$$G_C(s)G(s) = \left(K_P + \frac{K_I}{s} + K_D s\right)\left(\frac{1}{1+sT_e}\right)\left(\frac{1}{1+sT'_{do}}\right)$$

The PID controller gains $K_P$, $K_I$, and $K_D$ are then analytically determined by solving the characteristic equation:

$$\left(K_P + \frac{K_I}{s} + K_D s\right)\left(\frac{1}{1+sT_e}\right)\left(\frac{1}{1+sT'_{do}}\right) = -1$$

Three values of s are then used:

$s = -a+jb$ $s = -a-jb$ $S = -c$

Thus, there are three equations and three unknowns. The value of s for each of Equations s=−a+jb, s=−a−jb and s=−c can be substituted into:

$$\left(K_P + \frac{K_I}{s} + K_D s\right)\left(\frac{1}{1+sT_e}\right)\left(\frac{1}{1+sT'_{do}}\right) = -1$$

which provides the three equations. The three unknowns are $K_P$, $K_I$, and $K_D$. Therefore, it is possible to solve these three equations for $K_P$, $K_I$, and $K_D$. The controller also results in two zeros. The effect of zeros on the transient response is compensated by over design and involves a certain amount of trial and error and engineering judgment.

Preferably, but not necessarily, the above equations are implemented with a PID controller using a voltage regulator developed for small size generator set. This may, but not necessarily, include a microprocessor and signal conditioning circuits for generator voltage and PWM controlled regulator output. For example, this may include an available commercial regulator with limited memory and calculation power that is used to implement estimation algorithms. Preferably, but not necessarily, the generator voltage can be sampled with sixteen (10) bits resolution after anti-aliasing filters. The rms calculation of generator voltage can then be calculated on a predetermined period, e.g., every half cycle which amounts to 8.3 milliseconds for a 60 Hz system. Moreover, the self-tuning algorithm can be updated on a predetermined time period, e.g., every 400 milliseconds. When the self-tuning mode is activated by the user, the voltage regulator estimates a set of desired PID gains based on estimated time constants. The amplitude of the regulator output is then adjusted to maintain the voltage regulation in a linear region, which is a predetermined percentage of the rated generator voltage, e.g., 80%. This adjusted amplitude of regulator output is obtained during calculation of the system gain $K_G$.

For a simple user interface to digital voltage regulator with self-tuning feature, a personal computer ("PC") program can be implemented on any of a wide variety of processors. The following illustrative, but nonlimiting, functions that can be implemented in the software program include: basic diagnostic functions (wiring and metering calibration); estimate the loop gain of the closed loop with PI controller; estimate generator and exciter time constants using Particle Swarm Optimization ("PSO"); calculate PID controller gains using estimated time constants ($T_e$ and $T'_{do}$); and step response with real-time monitoring.

Therefore, a field engineer is able to activate a self-tuning mode utilizing this software program. This software program is able to determine PID gains based on rising time and estimated parameters (system gain and exciter/generator time constants) using either a pole-zero cancellation method or a pole placement design method.

Figure 9:
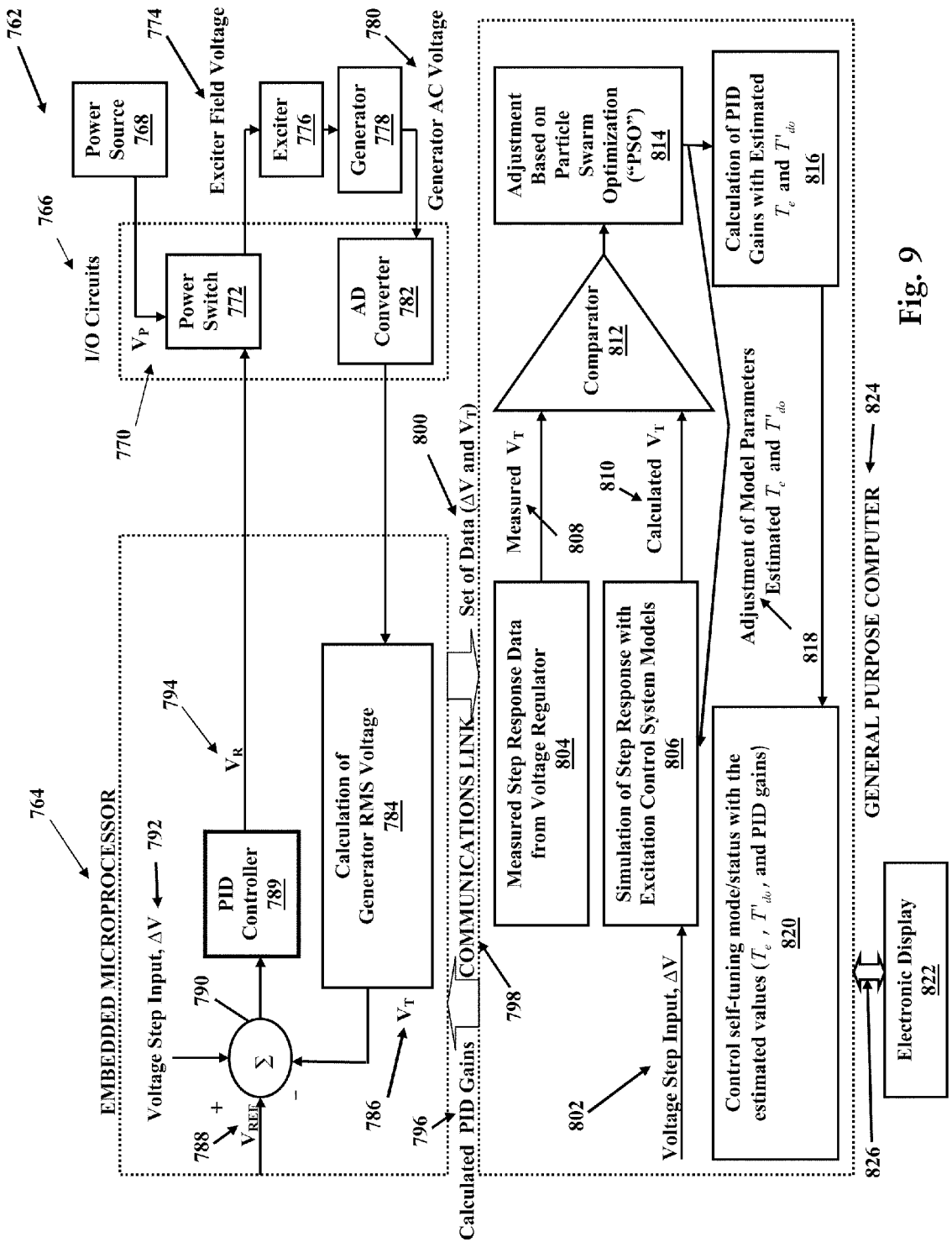
FIG. 9 shows a block diagram of an exemplary embodiment of the present invention utilizing at least one processor, input/output, an exciter, a generator and an associated power supply.

FIG. 9 illustrates a block diagram of an exemplary embodiment of the present invention and is generally indicated by numeral 762. I/O (Input/Output) circuitry 766 provides the interface between a first processor 764 and the heavy equipment, i.e., a power source 768, an exciter 776 and a generator 778 (Exciter/Generator/Power Source). The I/O circuitry 766 includes a power switch 772 and an analog-to-digital ("AD") converter 782. The power source 768 provides power input voltage $V_P$ 770 to the power switch 772. The power switch 772 is controlled by the first processor 764. A wide variety of computing devices may be utilized for the first processor 764, e.g., computers, controllers, and so forth. A preferred embodiment for the first processor 764 includes an embedded microprocessor. The power switch 772 also provides exciter field voltage 774 to the field coils of the exciter 776. The exciter 776 provides power to the field coils of generator 778. The a.c. output voltage 780 of generator 778 is connected to the analog-to-digital ("AD") converter 782. The analog-to-digital ("AD") converter 782 converts the input voltage level into a digital value which is passed on to the first processor 764. This digital value is then calculated 784, by the first processor 764, as a generator rms voltage $V_T$ 786. Optionally, the analog-to-digital ("AD") converter 782 could be contained within the first processor 764.

The first processor 764 is loaded with a generator output voltage set point labelled $V_{REF}$ 788. There is a voltage step response by increasing voltage reference by a predetermined percentage, e.g., five percent (5%), sampling the generator voltages during a first predetermined time period, e.g., every 50 milliseconds, and then recording the history of the sampled generator voltages during a second predetermined time period, e.g., five second interval. This voltage step input $\Delta V$ 792 is summed 790 with the generator output voltage set point $V_{REF}$ 788 and the generator rms voltage $V_T$ 786. This summation 790 is provided as input to a PID controller 789. The first processor 764 is programmed to implement a PID controller 789. The voltage regulator output $V_R$ 794 from the PID controller 789 is provided as input to the power switch 772.

There is a second processor 824 that is connected to the first processor 764 through electronic communication link 798, e.g., RS 232 Communication Port. A variety of electronic communication protocols could be used, and RS 232 is merely one example. A wide variety of computing devices may be utilized for the second processor 824, e.g., computers, controllers, microprocessors and so forth. A preferred embodiment for the second processor 824 includes a general purpose computer. The set of data 800 involving generator rms voltage, $V_T$ and voltage step input $\Delta V$ is transmitted from the first processor 764 through electronic communication link 798 to the second processor 824. The calculated PID gain values 796 based on the estimated time constants, using either the pole-zero method or pole placement method as described above, is transmitted from the second processor 824 through electronic communication link 798 to the first processor 764.

The voltage step input $\Delta V$ 802 is provided to create a simulation of step response with excitation control system models 806 that is compared against measured step response date from voltage regulator 804. This calculated generator rms voltage, $V_T$ 810 is compared against a measured generator rms voltage $V_T$ 808 with a comparator 812. The measured generator rms voltage $V_T$ 808 is the system's actual measured generator voltage of the exciter and the generator with a static load for $T_e$ and $T'_{do}$ and the calculated generator rms voltage $V_T$ 810 is the system's simulated generator voltage for $T_e$ and $T'_{do}$. These values are compared with the fitness function and then an adjustment is made using particle swarm optimization ("PSO") 814 where the best values are obtained and the particles position and velocity are updated as previously described above. The adjustment of the model parameters 814 $x_k=(T'_{do}, T_e)$ where $T'_{do}$ represents the generator time constant and $T_e$ represents the exciter time constant is fed back into the simulation of step response with excitation control system models 806.

The adjustment of the model parameters 814 $x_k=(T'_{do}, T_e)$ is also then used to calculate the PID gain values based on the estimated time constants 816, using either the pole-zero method or pole placement method as described above with calculations from the second processor 824. These PID gains with estimated values of generator time constant $T'_{do}$ and exciter time constant $T_e$ are then provided to a control 820 that operates the self-tuning mode and provides status of the operation, including values of generator time constant $T'_{do}$, exciter time constant $T_e$ and PID gains. This information can be provided to an electronic display 822 through an electrical conduit 826 from the control. 820. Any of a wide variety of electronic displays may suffice for the electronic display 822, including, but not limited to: cathode ray tube ("CRT"); storage tube; bistable display; nixie tube display; vector display; flat panel display; vacuum fluorescent display ("VF"); light-emitting diode ("LED") display; electroluminescent Display ("ELD"); plasma display panel ("PDP"); liquid crystal display ("LCD"); organic light-emitting diode displays ("OLED"); surface-conduction electron-emitter display ("SED"); laser optoelectronics; carbon nanotubes; and nanocrystal displays. Both the first processor 764 and the second processor 824 can be combined as a single processing mechanism and either embedded or located away from the exciter and the generator. Any of a wide variety of computing mechanisms may suffice for either the first processor 764 or the second processor 724

Figure 10:
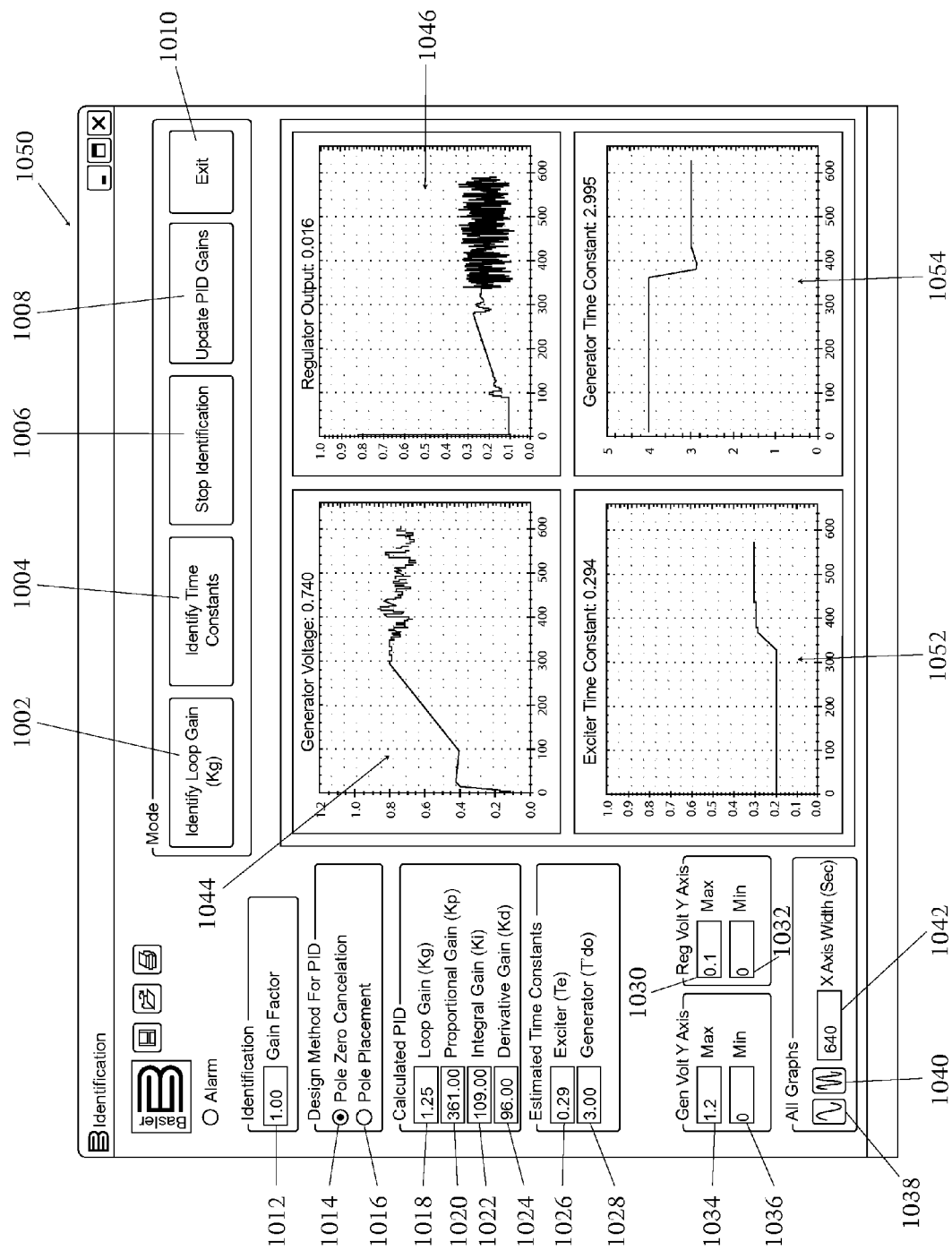
FIG. 10 is a graphical user interface showing estimation of time constants.

As shown in FIG. 10, a graphical user interface is generally indicated by numeral 1050. This graphical user interface 1050 appears on the electronic display 804, as shown in FIG. 9. Referring again to FIG. 10, there are five modes which include: identifying loop gain $K_{G\ 1002}$; identifying time constants 1004; stop identification 1006; updating PID gains 1008; and a software program exit function 1010. For identifying loop gain 1002, there is an input for identification of gain factor 1012. There is a click-on input 1014 for pole zero cancellation as a design method for a PID controller and a click-on input 1016 for pole placement as a design method for a PID controller.

For calculated PID, there are four outputs that include: loop gain $K_G$ 1018; proportional gain $K_P$ 1020; integral gain $K_I$ 1022; and derivative gain $K_D$ 1024. Additional outputs include estimated time constants for the exciter $T_e$ 1026 and the generator $T'_{do}$ 1028. There are a series of inputs for creating graphical representations. These include a maximum value for the generator voltage on the y-axis 1034; a minimum value for the generator voltage on the y-axis 1036; a maximum value for the regulator voltage on the y-axis 1030; and a minimum value for the regulator voltage on the y-axis 1032. There is a graphical output icon 1038 for extending a width of the x-axis and a graphical output icon 1040 for reducing width of the x-axis. There is also an input for a width of the x-axis in seconds 1042. There is a graphical representation of generator voltage 1044, e.g., value of 0.740 volts, and of regulator output 1046, e.g., value of 0.106 volts. There is also a graphical representation of a time constant for the exciter $T_e$ 1052, e.g., value of 0.294, and a graphical representation of a time constant for the generator $T'_{do}$ 1054, e.g., value of 2.995. This software program monitors system and estimated parameters continuously.

Figure 11:
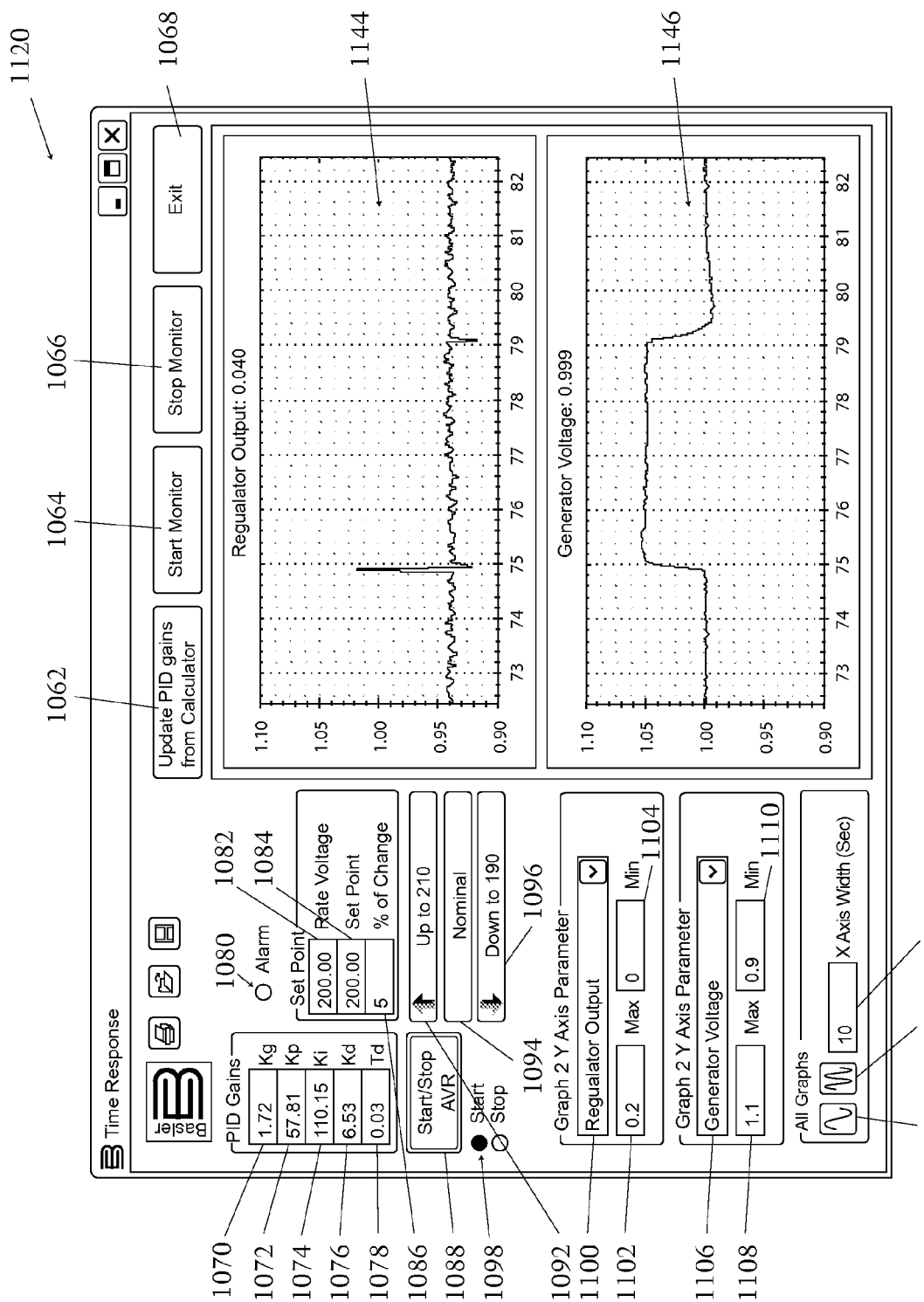
FIG. 11 is a graphical user interface showing a step response with calculated PID gains.

Real-time monitoring feature was also implemented to easily evaluate system performance of the voltage step responses is shown in FIG. 11, which is generally indicated by numeral 1120. There are four push button feature icons that include: update PID gains from calculator 1062; start monitor 1064; stop monitor 1066; and an exit function 1068. There are five inputs for PID gains that include: loop gain $K_G$ 1070; proportional gain $K_P$ 1072; integral gain $K_I$ 1074; derivative gain $K_D$ 1076 and the derivative filter time constant $T_D$ 1078. There is also a push button icon 1088 to stop and start the automatic voltage regulator.

There is an indicator 1080 to indicate an alarm condition as well as an indicator 1098 of whether the automatic voltage regulator is either stopped or started. Additionally, there is an input for rated voltage 1082, set point 1084, and percent (%) of change 1086. Moreover, a push button icon 1092 is used to increase the automatic voltage regulator to an upper predetermined value, e.g., 210, a push button icon 1094 to operate the automatic voltage regulator at a nominal value and a push button icon 1096 to decrease the automatic voltage regulator to a lower predetermined value, e.g., 190.

A drop-down input 1100 for a first graph is used to graph parameters on the Y-axis, e.g., generator voltage. There is an input for both a maximum value 1102 and a minimum value 1104. There is a drop-down input 1106 for a second graph to display parameters on the Y-axis, e.g., generator voltage. There is an input for both a maximum value 1108 and a minimum value 1110. There is a graphical output icon 1138 for extending a width of the x-axis and a graphical output icon 1140 for reducing width of the x-axis. There is also an input for a width of the x-axis in seconds 1142. There is a graphical representation of regulator output voltage 1144, e.g., value of 0.040, and of generator voltage 1146, e.g., value of 0.999.

This is the automatic voltage regulator response utilizing default values, which indicates a large overshoot which is caused by improper gains.

The performance of proposed self-tuning algorithm was verified using with simplified first order exciter and generator simulation models. These models are also implemented in a commercial regulator for small size of generator set. Estimation results of the proposed method are shown in Table 1 shown in FIG. 12, which is generally indicated by numeral 1200.

The external power input case (fixed power input voltage, i.e., $V_P$) is tested for comparison with a shunt application case. The results of two approaches are illustrated in the first table indicated by numeral 1202 for both a Recursive Least Square ("RLS") with linearization via feedback in comparison to the previously mentioned Particle Swarm Optimization ("PSO") technique. In this case, the RLS approach would appear to be more accurate.

The second table is generally indicated by numeral 1204 for a shunt application for both a Recursive Least Square ("RLS") with linearization via feedback in comparison to the previously mentioned Particle Swarm Optimization ("PSO") technique. There is no significant error that is caused for the shunt application.

The estimation error in the PSO approach is mainly caused by the incorrect starting time to apply the unit input to the exciter field, which is determined randomly at a time delay. A nonlimiting example of this time delay is about sixteen (16) milliseconds. In general, the random behavior is caused by inexact synchronization among the pulse width modulation ("PWM") signal update for the power amplifier, the rms calculation of 60 Hz voltage signal, and a real time interrupt time for control functions in the digital voltage regulator.

Figure 13:
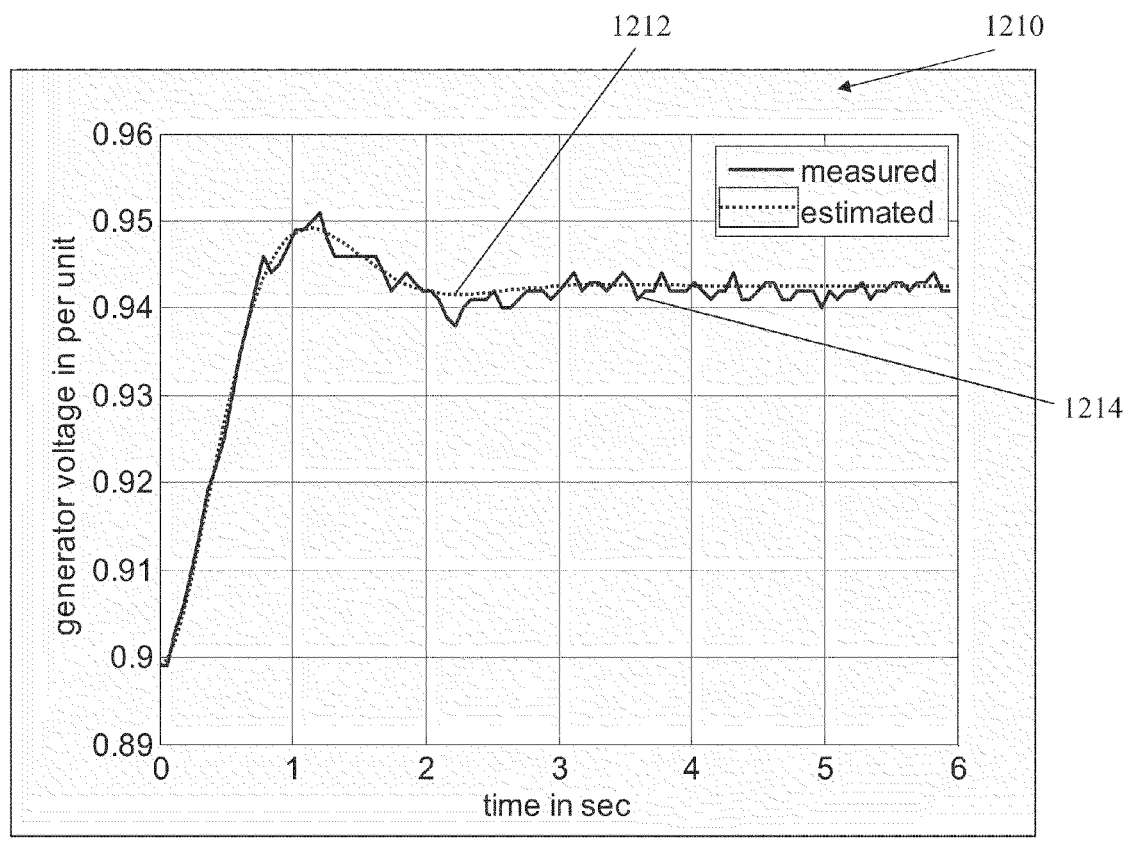
FIG. 13 is a graphical comparison of measured versus estimated response for the Particle Swarm Optimization ("PSO") technique for generator voltage over time.

The presence often percent (10%) relative error in generator voltage, the Particle Swarm Optimization ("PSO") approach arrives to a solution faster than the Recursive Least Square ("RLS"). For the Recursive Least Square ("RLS") approach, about thirty (30) seconds are required to converge to the time constants. On the other hand, it only takes several seconds for the Particle Swarm Optimization ("PSO") approach. This is shown on the third table indicated by numeral 1206. The typical identification results for the Particle Swarm Optimization ("PSO") approach is shown in FIG. 13, which is generally indicated by numeral 1210. The estimated values are indicated by numeral 1212 and the measured values are indicated by numeral 1214. The level of noise in the actual system step response is indicated by the measured values 1214.

As an illustrative, but nonlimiting example, performance of self-tuning algorithm is tested using the Diesel-Generating Set, which consists of a 75 kW, 208 Vac, 1800 RPM, 3 Phase synchronous generator. The excitation for this generator is provided by a permanent magnet generator ("PMG") excited 0.3 Amp, 7 Vdc, ac exciter at no load. Evaluation of system performance begins by performing voltage step responses to examine the behavior of the excitation system connected to the generator.

Figure 14:
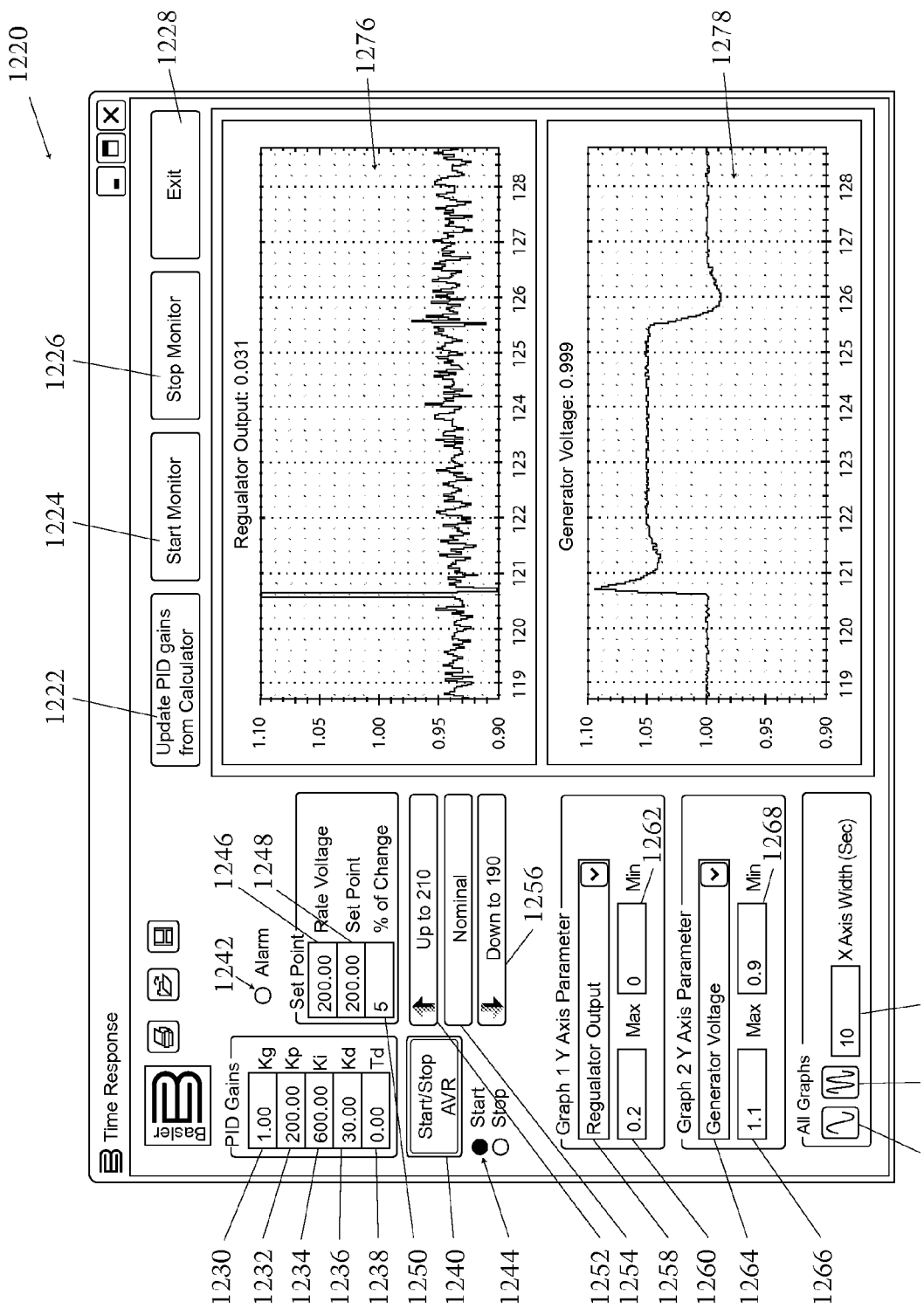
FIG. 14 is a graphical user interface showing an automatic voltage regulator response with default values.

An automatic voltage regulator ("AVR") uses default values is shown in FIG. 14, which is generally indicated by numeral 1220. There are four push button feature icons that include: update PID gains from calculator 1222; start monitor 1224; stop monitor 1226; and an exit function 1228. There are five inputs for PID gains that include: loop gain $K_G$ 1230; proportional gain $K_P$ 1232; integral gain $K_I$ 1234; derivative gain $K_D$ 1236 and the derivative filter time constant $T_D$ 1238. There is also a push button icon 1240 to stop and start the automatic voltage regulator.

There is an indicator 1242 to indicate an alarm condition as well as an indicator 1244 of whether the automatic voltage regulator is either stopped or started. Additionally, there is an input for rated voltage 1246, set point 1248, and percent (%) of change 1250. Moreover, a push button icon 1252 is used to increase the automatic voltage regulator to an upper predetermined value, e.g., 210, a push button icon 1254 to operate the automatic voltage regulator at a nominal value and a push button icon 1256 to decrease the automatic voltage regulator to a lower predetermined value, e.g., 190.

A drop-down input 1258 for a first graph is used to graph parameters on the Y-axis, e.g., regulator output. There is an input for both a maximum value 1260 and a minimum value 1262. There is a drop-down input 1264 for a second graph to display parameters on the Y-axis, e.g., generator voltage. There is an input for both a maximum value 1266 and a minimum value 1268. There is a graphical output icon 1270 for extending a width of the x-axis and a graphical output icon 1272 for reducing width of the x-axis. There is also an input for a width of the x-axis in seconds 1274. There is a graphical representation of regulator output 1276, e.g., value of 0.031, and of generator voltage 1278, e.g., value of 0.999. This is the automatic voltage regulator response utilizing default values, which indicates a large overshoot which is caused by improper gains.

Since exciter and generator time constants are not available, factory PID gains ($K_P$=200 shown by input 1232, $K_I$=600 shown by input 1234, $K_D$=30 shown by input 1236, and $T_D$=0.0 shown by input 1238) were selected, which was obtained for other generator by trial-and-error method. Since the factory gain for $K_G$=50 causes a large overshoot, it was reduced to $K_G$=1.0, shown by input 1232, to get a reasonable response 1276 and 1278.

Figure 15:
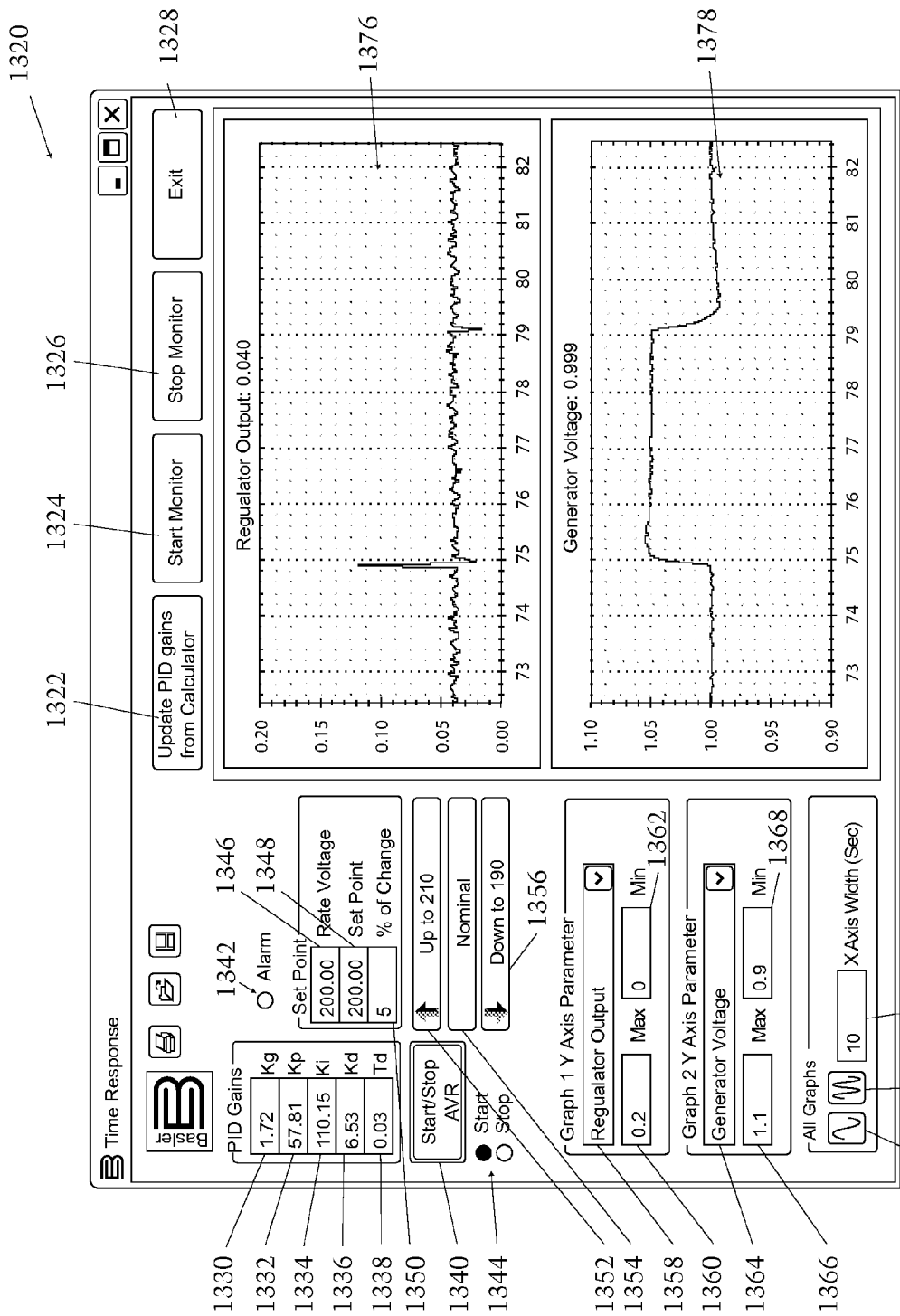
FIG. 15 is a graphical user interface showing self-tuned PID gains.

The self-tuning PID gains are shown in FIG. 15, which is generally indicated by numeral 1320. There are four push button feature icons that include: update PID gains from calculator 1322; start monitor 1324; stop monitor 1326; and an exit function 1328. There are five inputs for PID gains that include: loop gain $K_G$ 1330; proportional gain $K_P$ 1332; integral gain $K_I$ 1334; derivative gain $K_D$ 1336 and the derivative filter time constant $T_D$ 1338. There is also a push button icon 1340 to stop and start the automatic voltage regulator.

There is an indicator 1342 to indicate an alarm condition as well as an indicator 1344 of whether the automatic voltage regulator is either stopped or started. Additionally, there is an input for rated voltage 1346, set point 1348, and percent (%) of change 1350. Moreover, a push button icon 1352 is used to increase the automatic voltage regulator to an upper predetermined value, e.g., 210, a push button icon 1354 to operate the automatic voltage regulator at a nominal value and a push button icon 1356 to decrease the automatic voltage regulator to a lower predetermined value, e.g., 190.

A drop-down input 1358 for a first graph is used to graph parameters on the Y-axis, e.g., regulator output. There is an input for both a maximum value 1360 and a minimum value 1362. There is a drop-down input 1364 for a second graph to display parameters on the Y-axis, e.g., generator voltage. There is an input for both a maximum value 1366 and a minimum value 1368. There is a graphical output icon 1370 for extending a width of the x-axis and a graphical output icon 1372 for reducing a width of the x-axis. There is also an input for a width of the x-axis in seconds 1374. There is a graphical representation of regulator output 1376, e.g., value of 0.040, and of generator voltage 1378, e.g., value of 0.999. This is the response utilizing self-tuning PID gains.

This software program is designed for self-tuning features so that when the self-tuning mode is activated, PID gains are determined based on rising time and estimated parameters (system gain and exciter/generator time constants) using pole-zero cancellation method ($K_P$=57.81 shown by input 1332, $K_I$=110.15 shown by input 1334, and $K_D$=6.53 shown by input 1336). The time constant for derivative term was selected $T_D$=0.03, shown by input 1338, to reduce the noise effect. Much less commission time was required with the self-tuning feature.

The voltage step response of the first method using the automatic voltage regulator ("AVR") with default values is shown by numerals 1276 and 1278 in FIG. 14, is compared to self-tuning PID gains shown by numerals 1376 and 1378 in FIG. 15. The automatic voltage regulator ("AVR") with default values is shown by numerals 1276 and 1278 in FIG. 14 indicates a large overshoot with improper gains. The self-tuning PID gains, shown by numerals 1376 and 1378 in FIG. 15, provide a response with much less overshoot. The large overshoot in step up response is caused by asymmetric high forcing limit. This is a typical response for a rotary excitation control system which has no negative field forcing. For this case, the selection of proper controller gains is more important.

Figure 16:
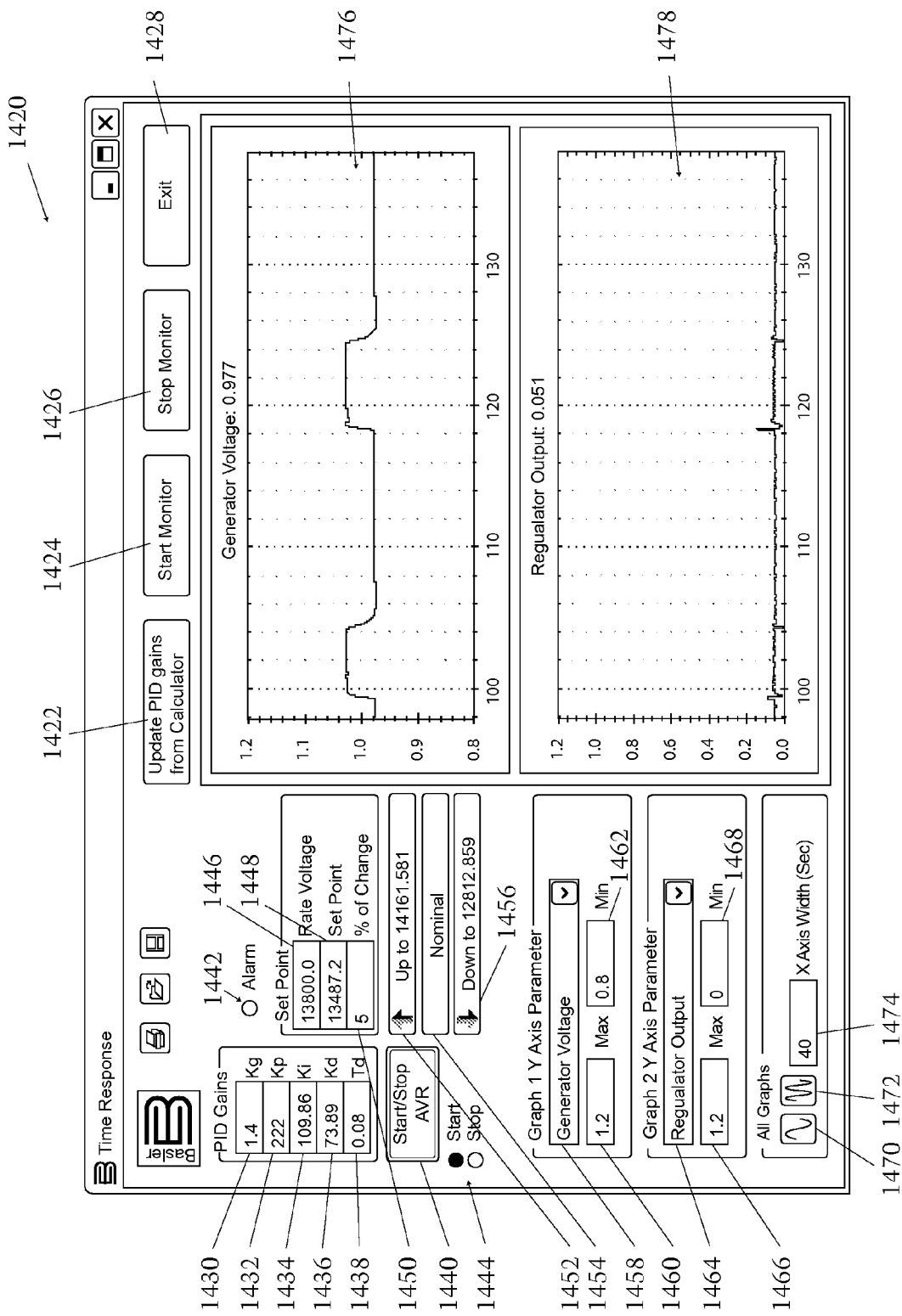
FIG. 16 is a graphical user interface showing the step response of a gas turbine generator set.

The self-tuning PID gains for a medium level of generator set with a gas turbine and generator rated at 13.8 kV and 15 MVA, respectively, is shown in FIG. 16, which is generally indicated by numeral 1420. There are four push button feature icons that include: update PID gains from calculator 1422; start monitor 1424; stop monitor 1426; and an exit function 1428. There are five inputs for PID gains that include: loop gain $K_G$ 1430; proportional gain $K_P$ 1432; integral gain $K_I$ 1434; derivative gain $K_D$ 1436 and the derivative filter time constant $T_D$ 1438. There is also a push button icon 1440 to stop and start the automatic voltage regulator.

There is an indicator 1442 to indicate an alarm condition as well as an indicator 1444 of whether the automatic voltage regulator is either stopped or started. Additionally, there is an input for rated voltage 1446, set point 1448, and percent (%) of change 1450. Moreover, a push button icon 1452 is used to increase the automatic voltage regulator to an upper predetermined value, e.g., 14,161.581 Volts, a push button icon 1454 to operate the automatic voltage regulator at a nominal value and a push button icon 1456 to decrease the automatic voltage regulator to a lower predetermined value, e.g., 12,812.859 Volts.

A drop-down input 1458 for a first graph is used to graph parameters on the Y-axis, e.g., generator voltage. There is an input for both a maximum value 1460 and a minimum value 1462. There is a drop-down input 1464 for a second graph to display parameters on the Y-axis, e.g., regulator output. There is an input for both a maximum value 1466 and a minimum value 1468. There is a graphical output icon 1470 for extending a width of the x-axis and a graphical output icon 1472 for reducing a width of the x-axis. There is also an input for a width of the x-axis in seconds 1474. There is a graphical representation of generator voltage 1476, e.g., value of 0.977, and of regulator output 1478, e.g., value of 0.051. This is the response utilizing self-tuning PID gains.

This software program is designed for self-tuning features so that when the self-tuning mode is activated, PID gains are determined based on rising time and estimated parameters (system gain and exciter/generator time constants) using pole-zero cancellation method ($K_P$=222 shown by input 1432, $K_I$=109.86 shown by input 1434, and $K_D$=73.89 shown by input 1436). The time constant for derivative term was selected $T_D$=0.08, shown by input 1438, to reduce the noise effect. As before, there is much less commission time was required with the self-tuning feature.

The Particle Swarm Optimization ("PSO") technique was found to be faster than a Recursive Least Square ("RLS") technique at estimating exciter and generator time constants. The computational speed is particularly important for small automatic voltage regulators (AVRs), where processing power comes with a high cost.

Although less estimation error can be obtained with Recursive Least Square ("RLS") approach than Particle Swarm Optimization ("PSO"), the Particle Swarm Optimization ("PSO") approach arrives to a solution faster than Recursive Least Square ("RLS") since all calculations can be achieved by the software program. For the Recursive Least Square ("RLS") approach, about 30 seconds are required to converge to the time constants with 10% error of rms voltage calculation. On the other hand, it takes several seconds for the Particle Swarm Optimization ("PSO") approach using standard personal computer, e.g., 2 GHz Intel Core 2 CPU.

The Particle Swarm Optimization ("PSO") technique was found to have very good accuracy and the results achieved by Particle Swarm Optimization ("PSO") technique were similar to those found using Recursive Least Square ("RLS") technique. Another advantage of the Particle Swarm Optimization ("PSO") approach is that continuous excitation is not required. Only one step response is performed and PID gains are calculated by computer program. Therefore, Particle Swarm Optimization ("PSO") approach is very desirable when working with a small automatic voltage regulator that does not have computational capabilities. Exemplary embodiments of the present invention therefore allow fast commissioning of generator sets with good performance results.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "have," "having," "includes" and "including" and similar terms as used in the foregoing specification are used in the sense of "optional" or "may include" and not as "required." Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims that follow.

The invention claimed is:

1. A system for self-tuning a PID controller for controlling an exciter and generator comprising:
   a power source;
   an exciter electrically connected to the power source;
   a generator that is electrically energized by the exciter;
   a processor that provides a PID controller and also for calculating an estimated exciter time constant and an estimated generator time constant using particle swarm optimization,
   wherein the calculating of the estimated exciter time constant and the estimated generator time constant comprises:
      performing a system disturbance by increasing a voltage reference by a predetermined percentage over a predetermined time period, initializing each particle position of the particle swarm optimization with an initial exciter time constant and generator time constant, calculating a generator voltage, performing a fitness evaluation, and obtaining and updating the best values; and repeating the calculating, fitness evaluation, and updating over a predetermined number of iterations; and wherein the processor further calculates gain values for the PID controller based on the estimated exciter time constant and estimated generator time constant and provides the gain values to the PID controller for control of the exciter field voltage.

2. The system for self-tuning a PID controller according to claim 1, wherein the processor generates the fitness evaluation by utilizing a summation of a plurality of values that represent the difference between a plurality of measured generator voltages and corresponding plurality of calculated generator voltages.

3. The system for self-tuning a PID controller according to claim 1, wherein the processor sets the initialized particle positions of exciter time constant and generator time constant within boundaries and a velocity to zero.

4. The system for self-tuning a PID controller according to claim 1, wherein the processor calculates generator voltage by utilizing a predetermined generator time constant and initial conditions, calculating closed loop voltage error, calculating voltage regulator output and calculating a new generator voltage and then repeating for a predetermined number of iterations calculating the closed loop voltage error, calculating the voltage regulator output and calculating the new generator voltage.

5. The system for self-tuning a PID controller according to claim 1, wherein the processor utilizes pole zero cancellation.

6. The system for self-tuning a PID controller according to claim 1, wherein the processor utilizes pole placement.

7. The system for self-tuning a PID controller according to claim 1, further including an analog-to-digital converter to convert an analog generator AC voltage to the digital value of RMS generator voltage.

8. The system for self-tuning a PID controller according to claim 1, further including a switch that is electrically connected to the power source, the exciter and the processor to regulate voltage to the exciter.

9. The system for self-tuning a PID controller according to claim 1 further including an electronic display for showing at least one of a diagnostic function and the real time monitoring of a disturbance.

10. A system for self-tuning a PID controller for controlling an exciter and generator comprising:

a power source;

an exciter electrically connected to the power source;

a generator;

a first processor that provides a PID controller with a combination of a reference voltage, a system disturbance by increasing the voltage reference by a predetermined percentage over a predetermined time period and a calculated generator voltage; and a second processor that receives the system disturbance and the calculated generator voltage through a communications link and then compares a simulation of a disturbance using the system disturbance and measured disturbance from a voltage regulator and then performs an adjustment using particle swarm optimization which is then provided to the simulation of a disturbance and also utilized in calculating an estimated exciter time constant, an estimated generator time constant, and PID gains, which are then provided through the communications link to the first processor, wherein the second processor controls a self-tuning mode and obtains operating status, which includes at least one of the estimated exciter time constant, the estimated generator time constant and the PID gains; and wherein the calculating of the estimated exciter time constant and the estimated generator time constant comprises:

performing a system disturbance by increasing a voltage reference by a predetermined percentage over a predetermined time period, initializing each particle position of the particle swarm optimization with an initial exciter time constant and generator time constant, calculating a generator voltage, performing a fitness evaluation, and obtaining and updating the best values; and repeating the calculating, fitness evaluation, and updating over a predetermined number of iterations;

wherein the gain values calculated for the PID controller are based on the estimated exciter time constant and estimated generator time constant for control of the exciter field voltage; and and an electronic display that is electrically connected to the second processor for displaying at least one of the operating status, a diagnostic function, the estimated exciter time constant, the estimated generator time constant and the PID gains with real time monitoring.

11. The system for self-tuning a PID controller according to claim 10, wherein the first processor is an embedded microprocessor.

12. The system for self-tuning a PID controller according to claim 10, wherein the second processor is a general purpose computer.

13. A method for self-tuning a PID controller comprising:

calculating an estimated exciter time constant and an estimated generator time constant with particle swarm optimization; and calculating gain values for the PID controller based on the estimated exciter time constant and estimated generator time constant; and providing the gain values to the PID controller for control of the exciter field voltage;

wherein the calculating of the estimated exciter time constant and the estimated generator time constant comprises:

performing a system disturbance by increasing a voltage reference by a predetermined percentage over a predetermined time period, initializing each particle position of the particle swarm optimization with an initial exciter time constant and generator time constant, calculating a generator voltage, performing a fitness evaluation, and obtaining and updating the best values; and repeating the calculating, fitness evaluation, and updating over a predetermined number of iterations.

14. The method for self-tuning a PID controller according to claim 13, wherein the step of performing a fitness evaluation further includes creating a summation of a plurality of values that represent the difference between a plurality of measured generator voltages and corresponding plurality of calculated generator voltages with the PID controller.

15. The method for self-tuning a PID controller according to claim 13, wherein the step of calculating a generator voltage further includes the steps of:
   (a) utilizing a predetermined time constant and initial conditions;
   (b) calculating closed loop voltage error;
   (c) calculating voltage regulator output;
   (d) calculating a new generator voltage;
and then repeating steps (b) through (d) over a predetermined number of iterations.

16. The method for self-tuning a PID controller according to claim 13, further includes:
   controlling a self-tuning mode and obtaining operating status with the processor; and
   displaying at least one of the operating status, a diagnostic function, the estimated exciter time constant, the estimated generator time constant and the PID gains with real time monitoring on an electronic display that is electrically connected to the processor.

* * * * *